United States Patent
Fukuta et al.

(10) Patent No.: US 8,274,745 B2
(45) Date of Patent: *Sep. 25, 2012

(54) IMAGE PICKUP LENS, IMAGE PICKUP DEVICE, AND MOBILE TERMINAL DEVICE

(75) Inventors: Yasunari Fukuta, Hachioji (JP); Masae Sato, Machida (JP); Takashi Kawasaki, Hachioji (JP); Kazuki Matsui, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,938

(22) Filed: Apr. 18, 2011

(65) Prior Publication Data

US 2011/0195746 A1 Aug. 11, 2011

Related U.S. Application Data

(62) Division of application No. 12/821,988, filed on Jun. 23, 2010, now Pat. No. 7,948,689.

(30) Foreign Application Priority Data

Jun. 26, 2009 (JP) ................. 2009-152054
Feb. 19, 2010 (JP) ................. 2010-035062

(51) Int. Cl.
*G02B 3/02* (2006.01)
*G02B 9/04* (2006.01)
(52) U.S. Cl. ........................ 359/717; 359/795
(58) Field of Classification Search .............. 359/717, 359/795

See application file for complete search history.

(56) References Cited

U.S. PATENT DOCUMENTS

| 7,492,528 | B2 | 2/2009 | Shyu |
| 7,948,689 | B2 * | 5/2011 | Fukuta et al. ................. 359/717 |
| 2010/0085650 | A1 | 4/2010 | Wu et al. |

FOREIGN PATENT DOCUMENTS

| JP | 2004-170460 | 6/2004 |
| JP | 2007-148407 | 6/2004 |
| JP | 2006-178026 | 7/2006 |
| JP | 4-064434 | 3/2008 |
| JP | 2008-292651 | 12/2008 |
| JP | 2009-042333 | 2/2009 |
| JP | 2009-103896 | 5/2009 |
| JP | 2009-103897 | 5/2009 |

* cited by examiner

*Primary Examiner* — William Choi
(74) *Attorney, Agent, or Firm* — Finnegan, Henderson, Farabow, Garrett & Dunner, L.L.P.

(57) ABSTRACT

An image pickup lens, comprises sequentially from an object side: an aperture stop, a first lens being a positive meniscus lens which has a convex surface at the object side and a concave surface at an image side opposite to the object side, and a second lens having a concave surface at the object side and an image side surface whose radius of curvature on an paraxial region is infinite or a negative value, wherein the first lens is the second lens and the image side surface of the second lens includes an aspheric surface to make a positive power strong toward a lens peripheral region, and wherein the image pickup lens is made to satisfy the following conditional formulas.

$$1.55 < n1 < 1.80 \quad (1)$$

$$0.4 < D3/f < 0.6 \quad (2)$$

$$40.0 < v2 < 90.0 \quad (3)$$

16 Claims, 32 Drawing Sheets

FIG. 3a
FIG. 3b
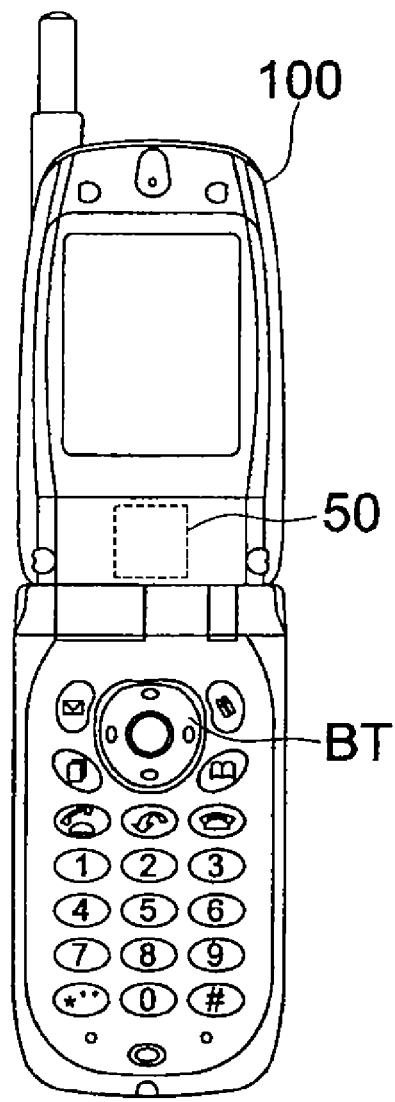
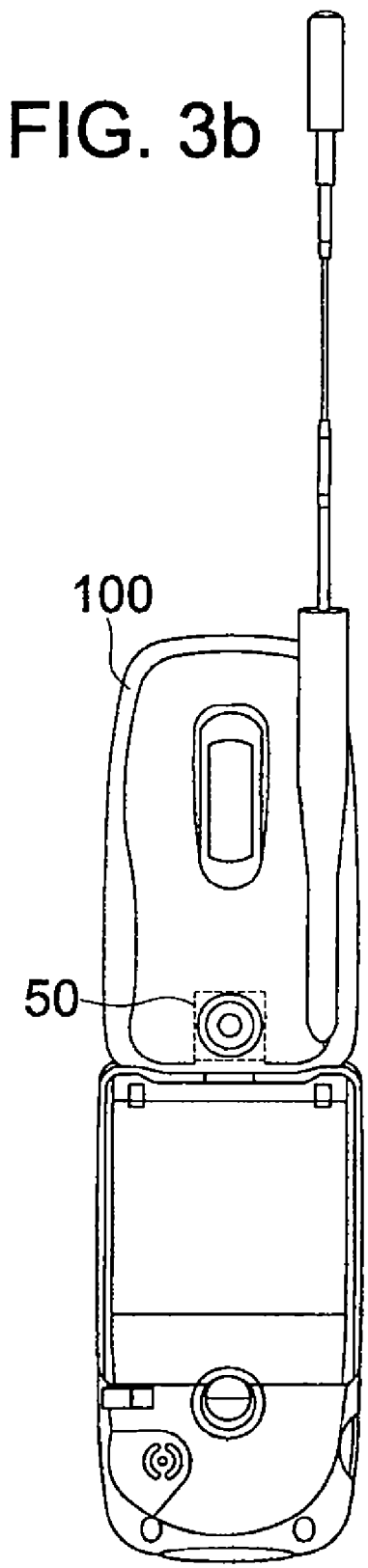

FIG. 11
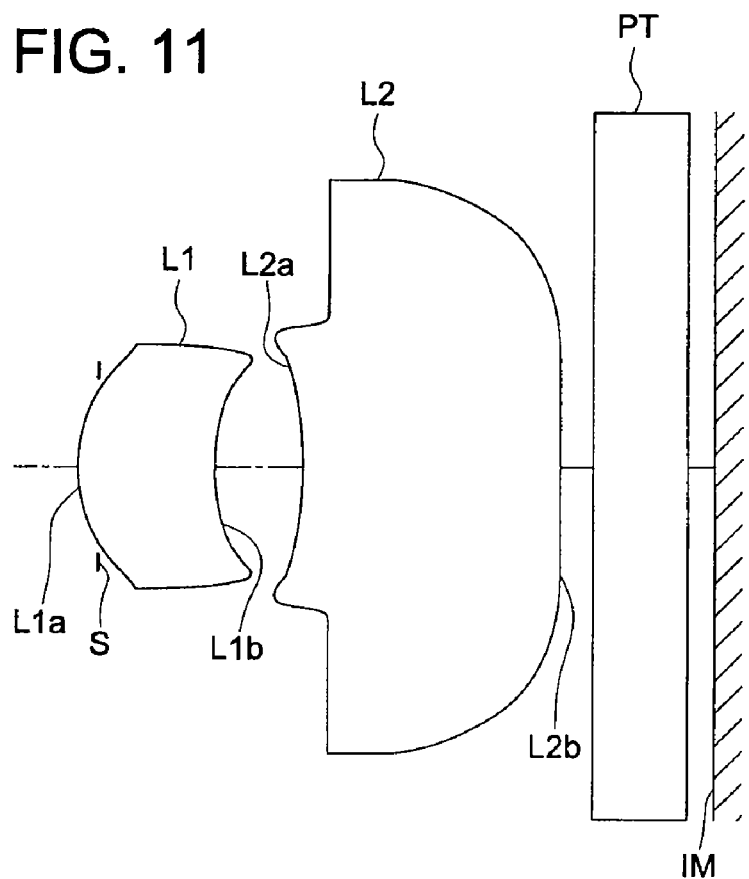
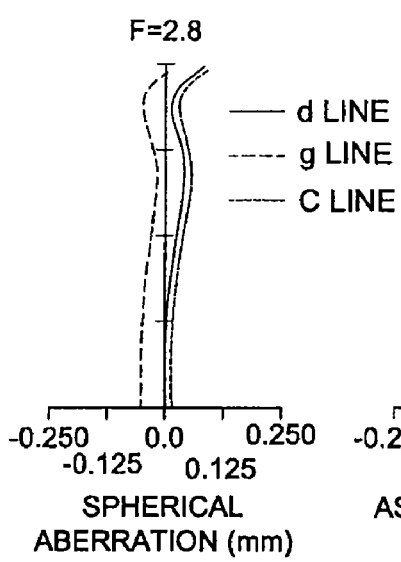
FIG. 12a
F=2.8
— d LINE
--- g LINE
···· C LINE
-0.250   0.0   0.250
    -0.125   0.125
SPHERICAL
ABERRATION (mm)
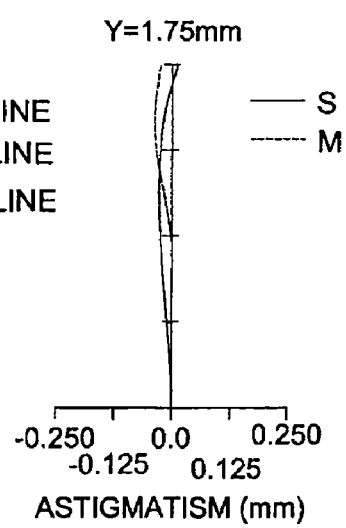
FIG. 12b
Y=1.75mm
— S
--- M
-0.250   0.0   0.250
    -0.125   0.125
ASTIGMATISM (mm)
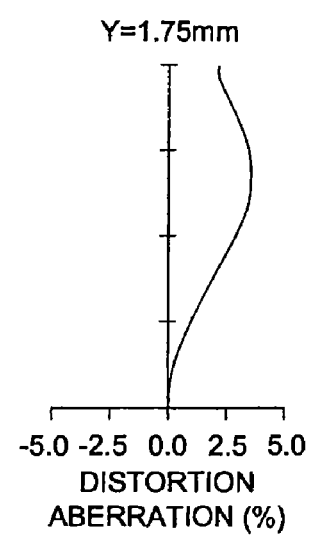
FIG. 12c
Y=1.75mm
-5.0 -2.5 0.0 2.5 5.0
DISTORTION
ABERRATION (%)

F=2.84

— d LINE
---- g LINE
---- C LINE

SPHERICAL
ABERRATION (mm)

Y=1.75mm

— S
--- M

ASTIGMATISM (mm)

Y=1.75mm

DISTORTION
ABERRATION (%)

FIG. 23
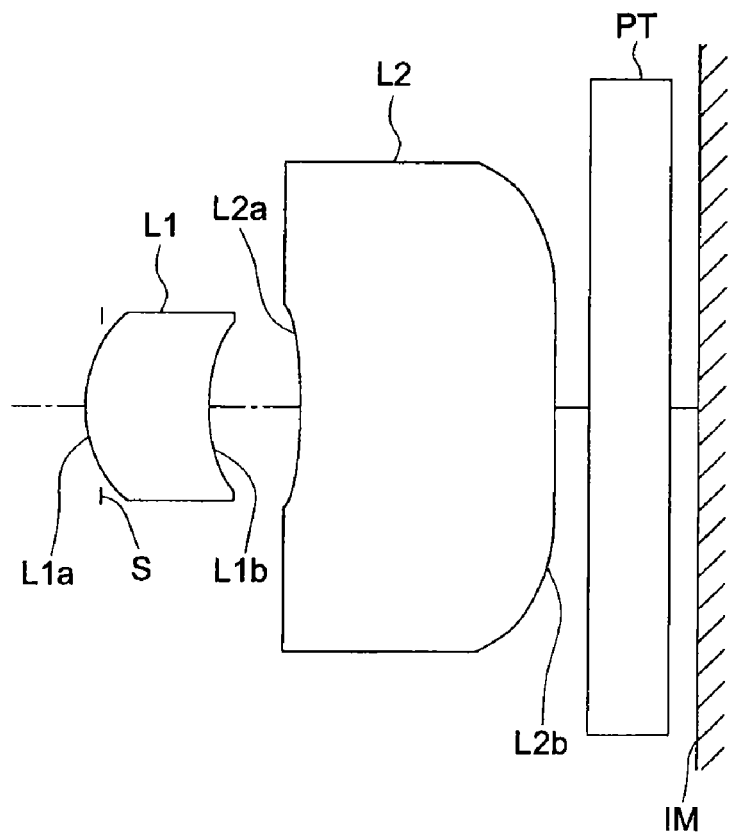
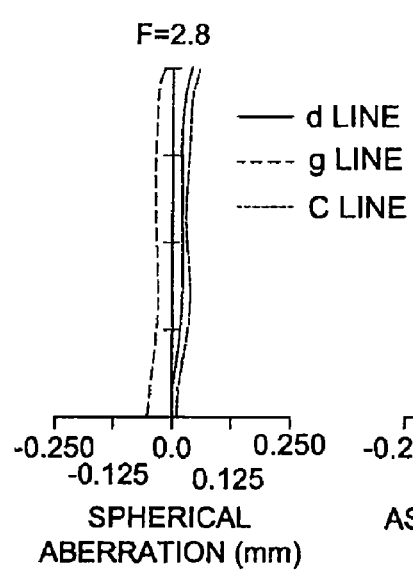
FIG. 24a
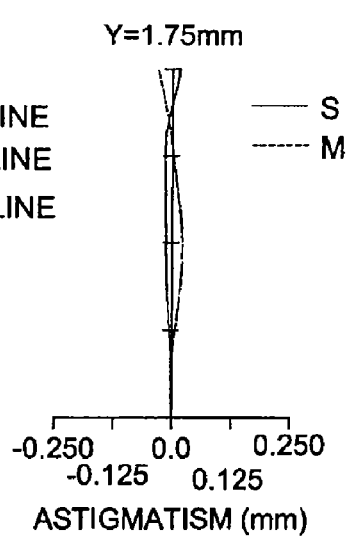
FIG. 24b
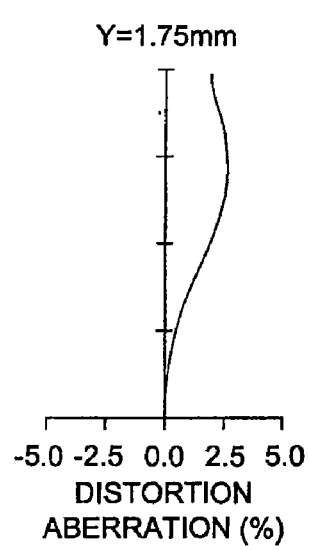
FIG. 24c

F=2.88

— d LINE
---- g LINE
—·— C LINE

SPHERICAL
ABERRATION (mm)

Y=1.75mm

— S
---- M

ASTIGMATISM (mm)

Y=1.75mm

DISTORTION
ABERRATION (%)

F=2.8
— d LINE
--- g LINE
— C LINE

-0.250  0.0  0.250
  -0.125  0.125
SPHERICAL
ABERRATION (mm)

Y=1.75mm
— S
--- M

-0.250  0.0  0.250
  -0.125  0.125
ASTIGMATISM (mm)

Y=1.75mm

-5.0 -2.5 0.0 2.5 5.0
DISTORTION
ABERRATION (%)

FIG. 35
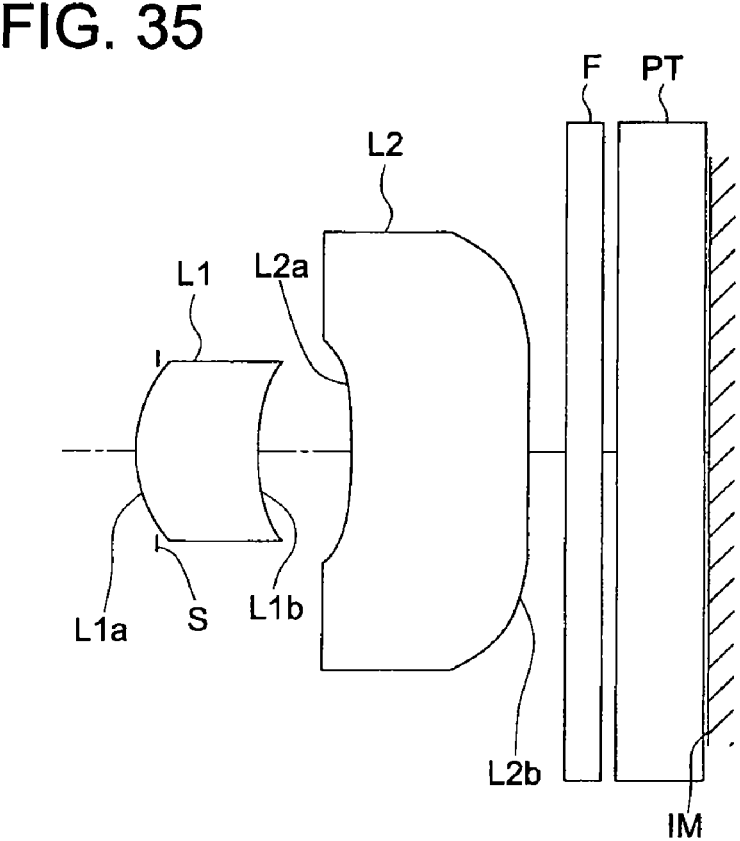
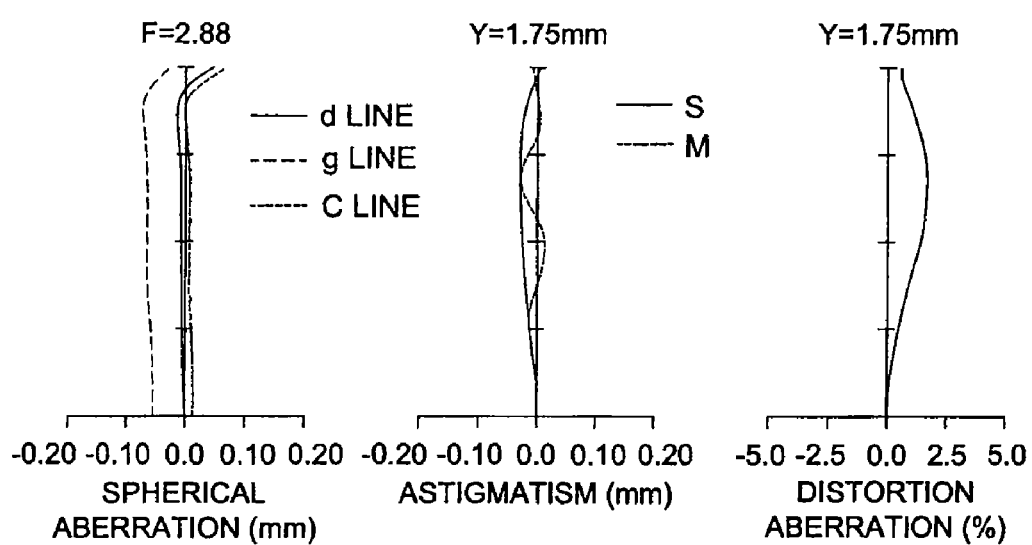
FIG. 36a  FIG. 36b  FIG. 36c

F=2.88
— d LINE
---- g LINE
----- C LINE
-0.20 -0.10 0.00 0.10 0.20
SPHERICAL ABERRATION (mm)

Y=1.75mm
— S
---- M
-0.20 -0.10 0.00 0.10 0.20
ASTIGMATISM (mm)

Y=1.75mm
-5.0 -2.5 0.0 2.5 5.0
DISTORTION ABERRATION (%)

IMAGE PICKUP LENS, IMAGE PICKUP DEVICE, AND MOBILE TERMINAL DEVICE

This is a division of U.S. Application Ser. No. 12/821,988, filed Jun. 23, 2010, now U.S. Pat. NO. 7,948,689, and claims the benefit of Japan Patent Application No. JP 2009-152054, filed Jun. 26, 2009 and Japan Patent Application No. JP 2010-036062, filed Feb. 19, 2010, all of which are incorporated herein by reference.

TECHNICAL FIELD

The present invention relates to an image pickup lens, and in particular, relates to a small thin image pickup lens suitable for being incorporated into a notebook PC and a mobile terminal device and to an image pickup device and a mobile terminal device employing it.

BACKGROUND ART

In recent years, small thin image pickup devices have been incorporated in a mobile terminal device which is a small thin electronic device such as a mobile telephone, a PDA (Personal Digital Assistant) and the like, whereby it becomes possible to transmit not only voice information but image information to a remote place mutually among the mobile terminal devices.

As an image pickup element used for these image pickup devices, solid state image pickup elements, such as a CCD (Charge Coupled Device) type image sensor and a CMOS (Complementary Metal-Oxide Semiconductor) type image sensor, are employed. In recent years, the miniaturization of the pixel pitch of an image pickup element has progressed, and high resolution and high performance have been attained by high pixel density. On the other hand, the miniaturization of the image sensor is attained while a high pixel density is maintained.

Moreover, as a lens to form an image of an object on these image pickup elements, a lens made of resin suitable for mass production has been employed in order to attain more low cost. Since such a lens made of resin has a good processability, a technique to form an aspheric surface on the lens has responded to a request for high performance. As such a lens, a lens structure constituted with two lenses is proposed by Patent Documents 1 to 9.

Patent Document 1: U.S. Pat. No. 7,492,528
Patent Document 2: Japanese Unexamined Patent Publication No. 2007-148407
Patent Document 3: Japanese Unexamined Patent Publication No. 2009-42333
Patent Document 4: Japanese Unexamined Patent Publication No. 2006-178026
Patent Document 5: Japanese Unexamined Patent Publication No. 2004-170460
Patent Document 6: Japanese Patent Publication No. 4064434
Patent Document 7: Japanese Unexamined Patent Publication No. 2008-292651
Patent Document 8: Japanese Unexamined Patent Publication No. 2009-103896
Patent Document 9: Japanese Unexamined Patent Publication No. 2009-103897

However, in the image pickup lenses disclosed by the Patent Documents 1 and 2, all lenses are constituted with positive lenses, and astigmatic is not corrected sufficiently so that the image pickup lenses cannot respond sufficiently to the high pixel density.

On the other hand, Patent Documents 3 through 9 disclose an image pickup lens in which the second lens is made as a negative lens. However, there is a problem that curvature of image field is large or chromatic aberration of magnification is not corrected sufficiently.

Moreover, in recent years, as a method of mounting a lens module on a base boar at low cost in large quantity, proposed is a method in which a lens module is installed together with an IC (Integrated Circuit) chip and other electronic components on a base board on which solder is potted beforehand and is subjected to a reflow process (heating process) to melt the solder so that the lens module and the electronic components are mounted simultaneously on the base board. Therefore, there is a real situation that an image pickup lens excellent in heat resistance to be endurable for the reflow process is required.

The present invention has been made in view of such a situation, and an object of the invention is to provide an image pickup lens, an image pickup device employing the image pickup lens and a mobile terminal device in which chromatic aberration can be corrected up to a periphery of an image plane with a small number of lenses and the image pickup lens has a high performance, is small and corresponds to an image pickup element with a high pixel density.

Here, With regard to the criterion of a small image pickup lens, the present invention aims the miniaturization of the level to satisfy the conditional formula (12). When the range is satisfied, the overall length of a lens can be shortened and the outer diameter of the lens can be made also small synergistically. With this, it becomes possible to make the entire body of an image pickup device small and light.

$$TL/2Y<1.5 \tag{12}$$

where TL represents a distance on an optical axis from a lens surface located closest to an object in the entire system of the image pickup lens to an image side focal point, and 2Y represents a length of a diagonal line of an image taking surface of a solid state image pickup element (a length of a diagonal line of a rectangle effective pixel region of a solid state image pickup element).

Herein, "image side focal point" means an image point when light rays in a finite object distance described in Tables 1 to 13 in Examples enter. Further, in the case that a parallel plate such as an optical low pass filter, an infrared ray cut filter, a band pass filter, and a seal glass of a solid state image pickup element package is located between a lens surface position closest to an image side in an image pickup lens and an image side focal point, the parallel plate portion is made to an air conversion distance and the above TL is calculated by the use of the air conversion distance.

Furthermore, it is more desirable to satisfy the conditional formula (12'). When the range specified by the conditional formula (12') is satisfied, a lens can be made more small and light. In addition, since an effective radius in which actual light rays pass through becomes small, it becomes possible to make a space to arrange a mechanism for short distance photography around the lens. As a result, high performance can be attained while the size is maintained.

$$TL/2Y<0.9 \tag{12'}$$

SUMMARY OF THE INVENTION

The above object can be attained by the following structures.

An image pickup lens described in Item 1 comprises, in the order from an object side, an aperture stop, a first lens and a second lens, wherein the first lens is a positive meniscus lens which has a convex surface at the object side and a concave surface at the image side, the second lens has a concave surface at the object side and an image side surface whose paraxial radius of curvature (a radius of curvature on the paraxial region) is infinite or negative, and the image side surface of the second lens is provided with an aspheric surface to make a positive power strong toward a lens peripheral region, and wherein the image pickup lens is characterized by satisfying the following conditional formulas:

$$1.55 < n1 < 1.80 \tag{1}$$

$$0.4 < D3/f < 0.6 \tag{2}$$

$$40.0 < v2 < 90.0 \tag{3}$$

where n1 represents a refractive index of the first lens ford spectral line, D3 represents a core thickness (a thickness on the optical axis) (mm) of the second lens, f represents a focal distance (mm) of the entire system, and v2 represents of an Abbe's number of the second lens.

With the structure that the first surface (the object side surface of the first lens) is made a convex surface facing the object side and the second surface (the image side surface of the first lens) and the third surface (the object side surface of the second lens) are made a concave surface respectively so as to face each other, the negative power of each of the second surface and the third surface can be made strong while the positive power of the entire system of the image pickup lens is maintained, whereby a Petzval sum can be made small. Further, as specified in the conditional formula (1), the refractive index of the positive first lens is made high, and, in addition, the second lens is made to have a negative power at the paraxial region, whereby the Petzval sum can be made smaller. Further, in order to enhance the telecentric property and to make the overall length shorter, the aperture stop is arranged at the most object side (here, the most object side does not means the object side than an apex of the object side surface of the first lens and means the case that the aperture stop is arranged at the object side than the object side surface of the first lens), and, in addition, the last lens surface (the image side surface of the second lens) has a paraxial radius of curvature being negative or infinite and includes an aspheric surface to make a positive power strong toward a peripheral region of the lens. Here, with regard to the definition of the power on a peripheral region of a lens, the following definition is employed in this specification. "When a parallel light flux is made enter a lens from an infinite long distance of the object side and ζ represents an angle of inclination of the light flux after having passed through the lens, a lens power φ at an arbitrary light ray passing height h on a peripheral region of a lens is represented by the formula (φ=tan ζ/h). (Reference: Japanese Unexamined Patent Publication No. 2004-326097)" Further, the term "radius of curvature being infinite" means a radius of curvature being 10 m (=10,000 mm) or more regardless of a sign of negative or positive. Herein, as such a paraxial radius of curvature, an approximate value r' of the paraxial radius of curvature obtained by the following formula with an amount s of sag measured by a contact type method or a non-contact type method with an Ultra-high Accuracy 3-D Profilometer (UA3P) may be used $$r' = \{(h)^2 + (s)^2\}/(2s)$$

where h represents a height corresponding to 1/10 of an effective radius of a lens surface and s represents an amount of sag which is an amount of displacement in the direction parallel to the optical axis from an original point to an apex of a surface at a height h of a lens surface (refer FIG. 47). Here, the effective radius of a lens surface means a height in the direction perpendicular to the optical axis from a point where a light ray passing at the most outside (a position most distant from the optical axis of a lens) among all light rays forming an image at a maximum image height crosses a lens surface to the optical axis.

Furthermore, when the core thickness of the second lens is set so as to exceed the lower limit of the conditional formula (2), a light flux which has diverged on the object side surface of the second lens can converge effectively on the image side surface, whereby the telecentric property can be improved. In addition, a light flux having entered the second lens diverges on the object side concave surface of the second lens, and then light rays of the light flux are separated for each image height and emitted from the image side surface of the second lens. Further, when the core thickness of the second lens is set so as to exceed the lower limit of the conditional formula (2), the light rays of the light flux can be separated sufficiently for each image height, whereby it becomes easy to correct aberration for each image height by the aspheric surface of the image side surface of the second lens. On the other hand, when the core thickness of the second lens is set to be less than the upper limit of the conditional formula (2), it becomes possible to obtain an image pickup lens whose overall length does not become large excessively. At this time, since the peripheral region of the second lens has a positive power for off-axis light rays, a magnification chromatic aberration becomes large. However, when an Abbe's number is made large as specified in the conditional formula (3), the occurrence of the magnification chromatic aberration can be suppressed, whereby the chromatic aberration can be corrected up to a peripheral region of an image plane with a small number of lenses and it becomes possible to attain an optical system corresponding to high density pixels with a high performance and small size.

The aspheric surface which makes the positive power strong toward a spherical region of a lens here is an aspheric surface which is arranged at an object side than a circular are formed by a radius of curvature at a position where main light rays of a light flux (a light flux at a maximum image height) forming an image at corners of a sensor.

Further, the image pickup lens of the present invention preferably satisfies the following conditional formulas (1'), (2') and (3').

$$1.55 < n1 < 1.70 \tag{1'}$$

$$0.4 < D3/f < 0.6 \tag{2'}$$

$$48.0 < v2 < 80.0 \tag{3'}$$

When the value of n1 is less than the upper limit of the conditional formula (1'), a material having a high frequency of use and being low cost can be chosen, whereby the cost of the image pickup lens can be lowered. When the value of v2 exceeds the lower limit of the conditional formula (3'), the occurrence of the magnification chromatic aberration can be reduced more. On the other hand, when the value of v2 is made to be less than the upper limit of the conditional formula (3'), on-axis chromatic aberration can be corrected, whereby it is possible to provide an image pickup lens having smaller chromatic aberration from the center to the peripheral region of an image plane.

Further, the image pickup lens of the present invention preferably satisfies the following conditional formulas (1'), (2') and (3').

$$1.55 < n1 < 1.60 \tag{1''}$$

$$0.4 < D3/f < 0.6 \tag{2''}$$

$$55.0 < v2 < 70.0 \tag{3''}$$

When the value of n1 is less than the upper limit of the conditional formula (1"), a material having a higher frequency of use and being low cost can be chosen, whereby the cost of the image pickup lens can be lowered more. When the value of v2 exceeds the lower limit of the conditional formula (3"), the occurrence of the magnification chromatic aberration can be reduced more. On the other hand, when the value of v2 is made to be less than the upper limit of the conditional formula (3"), on-axis chromatic aberration can be corrected more, whereby it is possible to provide an image pickup lens having further smaller chromatic aberration from the center to the peripheral region of an image plane.

An image pickup lens described in Item 2 comprises, in the order from an object side, an aperture stop, a first lens and a second lens, wherein the first lens is a positive meniscus lens which has a convex surface at the object side and a concave surface at the image side, the second lens is a negative meniscus lens which has a concave surface at the object side and a convex surface at the image side, and the last lens surface is provided with an aspheric surface to make a positive power strong toward a lens peripheral region, and wherein the image pickup lens is characterized by satisfying the following conditional formulas:

$$1.55 < n1 < 1.80 \quad (1)$$

$$0.4 < D3/f < 0.6 \quad (2)$$

$$40.0 < v2 < 90.0 \quad (3)$$

where n1 represents a refractive index of the first lens for d spectral line, D3 represents a core thickness (a thickness on the optical axis) (mm) of the second lens, f represents a focal distance (mm) of the entire system, and v2 represents of an Abbe's number of the second lens.

With the structure that the first surface (the object side surface of the first lens) is made a convex surface facing the object side and the second surface (the image side surface of the first lens) and the third surface (the object side surface of the second lens) are made a concave surface respectively so as to face each other, the negative power of each of the second surface and the third surface can be made ong while the positive power of the entire system of the image pickup lens is maintained, whereby a Petzval sum can be made small. Further, as specified in the conditional formula (1), the refractive index of the positive first lens is made high, and, in addition, the second lens is made to have a negative power at the paraxial region, whereby the Petzval sum can be made smaller. Further, in order to enhance the telecentric property and to make the overall length shorter, the aperture stop is arranged at the most object side (here, the most object side does not means the object side than an apex of the object side surface of the first lens and means the case that the aperture stop is arranged at the object side than the object side surface of the first lens), and, in addition, the last lens surface (the image side surface of the second lens) is a convex surface facing the image side at the paraxial region and includes an aspheric surface to make a positive power strong toward a peripheral region of the lens.

Furthermore, when the core thickness of the second lens is set so as to exceed the lower limit of the conditional formula (2), a light flux which has diverged on the object side surface of the second lens can converge effectively on the image side surface, whereby the telecentric property can be improved. In addition, a light flux having entered the second lens diverges on the object side concave surface of the second lens, and then light rays of the light flux are separated for each image height and emitted from the image side surface of the second lens.

Further, when the core thickness of the second lens is set so as to exceed the lower limit of the conditional formula (2), the light rays of the light flux can be separated sufficiently for each image height, whereby it becomes easy to correct aberration for each image height by the aspheric surface of the image side surface of the second lens. On the other hand, when the core thickness of the second lens is set to be less than the upper limit of the conditional formula (2), it becomes possible to obtain an image pickup lens whose overall length does not become large excessively. At this time, since the peripheral region of the second lens has a positive power for off-axis light rays, a magnification chromatic aberration becomes large. However, when an Abbe's number is made large as specified in the conditional formula (3), the occurrence of the magnification chromatic aberration can be suppressed, whereby the chromatic aberration can be corrected up to a peripheral region of an image plane with a small number of lenses and it becomes possible to attain an optical system corresponding to high density pixels with a high performance and small size.

The aspheric surface which makes the positive power strong toward a spherical region of a lens here is an aspheric surface which is arranged at an object side than a circular arc formed by a radius of curvature at a position where main light rays of a light flux (a light flux at a maximum image height) forming an image at corners of a sensor.

Further, the image pickup lens of the present invention preferably satisfies the following conditional formulas (1'), (2') and (3').

$$1.55 < n1 < 1.70 \quad (1')$$

$$0.4 < D3/f < 0.6 \quad (2')$$

$$48.0 < v2 < 80.0 \quad (3')$$

When the value of n1 is less than the upper limit of the conditional formula (1'), a material having a high frequency of use and being low cost can be chosen, whereby the cost of the image pickup lens can be lowered. When the value of v2 exceeds the lower limit of the conditional formula (3'), the occurrence of the magnification chromatic aberration can be reduced more. On the other hand, when the value of v2 is made to be less than the upper limit of the conditional formula (3'), on-axis chromatic aberration can be corrected, whereby it is possible to provide an image pickup lens having smaller chromatic aberration from the center to the peripheral region of an image plane.

Further, the image pickup lens of the present invention preferably satisfies the following conditional formulas (1'), (2') and (3').

$$1.55 < n1 < 1.60 \quad (1'')$$

$$0.4 < D3/f < 0.6 \quad (2'')$$

$$55.0 < v2 < 70.0 \quad (3'')$$

When the value of n1 is less than the upper limit of the conditional formula (1"), a material having a higher frequency of use and being low cost can be chosen, whereby the cost of the image pickup lens can be lowered more. When the value of v2 exceeds the lower limit of the conditional formula (3"), the occurrence of the magnification chromatic aberration can be reduced more. On the other hand, when the value of v2 is made to be less than the upper limit of the conditional formula (3"), on-axis chromatic aberration can be corrected more, whereby it is possible to provide an image pickup lens having further smaller chromatic aberration from the center to the peripheral region of an image plane.

In the image pickup lens described in Item 1 or 2, the image pickup lens described in Item 3 is characterized in that the second lens satisfies the following conditional formula (4):

$$1.55 < n2 < 1.80 \tag{4}$$

where n2 represents a refractive index of the second lens for d spectral line.

Since the first lens and the second lens have a positive power for a light flux foaming an image on a peripheral region of an image plane, when the refractive index n2 of the second lens is set to exceed the lower limit of the conditional formula (4), the occurrence of the curvature of an image plane can be suppressed. On the other hand, when the refractive index n2 of the second lens is set to be less than the upper limit of the conditional formula (4), the deterioration of the curvature of an image plane in the vicinity of the paraxial region can be suppressed.

Further, the image pickup lens of the present invention preferably satisfies the following conditional formula (4').

$$1.55 < n2 < 1.70 \tag{4'}$$

When the refractive index n2 of the second lens is set to be less than the upper limit of the conditional formula (4'), the deterioration of the curvature of an image plane in the vicinity of the paraxial region can be suppressed more.

Further, the image pickup lens of the present invention more preferably satisfies the following conditional formula (4").

$$1.55 < n2 < 1.60 \tag{4"}$$

When the refractive index n2 of the second lens is set to be less than the upper limit of the conditional formula (4"), the deterioration of the curvature of an image plane in the vicinity of the paraxial region can be suppressed still more.

In the image pickup lens described in any one of Items 1 to 3, the image pickup lens described in Item 4 is characterized in that the second lens satisfies the following conditional formula (5):

$$f2/f < -3.0 \tag{5}$$

where f2 represents the focal distance (mm) of the second lens.

Since the second lens has a negative power at the paraxial region, when the focal distance f2 of the second lens is set to be weak negative as prescribed in the conditional formula (5), the curvature of an image plane in the vicinity of the paraxial region can be suppressed, whereby uniform image quality can be obtained on the entire image plane.

Further, the image pickup lens of the present invention preferably satisfies the following conditional formula (5').

$$-4.0 < f2/f < -3.0 \tag{5'}$$

When the value of f2/f is set to exceed the lower limit of the conditional formula (5'), the negative power of the second lens does not become weak excessively, on-axis chromatic aberration generated by the first lens can be corrected.

In the image pickup lens described in any one of Items 1 to 4, the image pickup lens described in Item 5 is characterized in that the second lens satisfies the following conditional formula (6):

$$-0.6 < f/r3 < -0.1 \tag{6}$$

where r3 represents a radius (mm) of curvature of the object side surface of the second lens.

When the value of f/r3 is set to exceed the lower limit of the conditional formula (6) for the concave surface at the object side of the second lens, it becomes possible to prevent light rays having entered the second lens from diverging excessively so that the telecentric property can be maintained. Moreover, on the other hand, when the value of f/r3 is set to be less than the upper limit of the conditional formula (6), light rays having entered the second lens can diverge strongly, whereby the overall length can be reduced and the telecentric property can be maintained. Moreover, in addition, since a Petzval sum can be made small, the curvature of an image plane can be suppressed.

Further, the image pickup lens of the present invention preferably satisfies the following conditional formula (6').

$$-0.6 < f/r3 < -0.3 \tag{6'}$$

When the value of f/r3 is set to be less than the upper limit of the conditional formula (6'), light rays having entered the second lens can diverge more strongly, whereby the overall length can be reduced more and the telecentric property can be maintained.

Further, the image pickup lens of the present invention more preferably satisfies the following conditional formula (6").

$$-0.6 < f/r3 < -0.4 \tag{6"}$$

When the value of f/r3 is set to be less than the upper limit of the conditional formula (6"), light rays having entered the second lens can diverge still more strongly, whereby the overall length can be reduced still more and the telecentric property can be maintained.

In the image pickup lens described in any one of Items 1 to 5, the image pickup lens described in Item 6 is characterized in that the second lens satisfies the following conditional formula (6):

$$-0.5 < f/r4 < 0.0 \tag{7}$$

where r4 represents a radius (mm) of curvature of the image side surface of the second lens.

With regard to the radius r4 of curvature of the image side surface of the second lens, as specified in the conditional formula (7), when the radius of curvature of the image side surface of the second lens is made in a weak convex configuration, a Petzval sum is prevented from becoming large excessively.

Further, the image pickup lens of the present invention preferably satisfies the following conditional formula (7').

$$-0.35 < f/r4 < 0.0 \tag{7'}$$

When the value of f/r4 is set to exceed the lower limit of the conditional formula (7'), the deterioration of the curvature of an image plane can be prevented more.

Further, the image pickup lens of the present invention more preferably satisfies the following conditional formula (7").

$$-0.15 < f/r4 < 0.0 \tag{7"}$$

When the value of f/r4 is set to exceed the lower limit of the conditional formula (7"), the deterioration of the curvature of an image plane can be prevented still more.

In the image pickup lens described in any one of Items 1 to 6, the image pickup lens described in Item 7 is characterized in that the first lens satisfies the following conditional formula (8):

$$0.8 < f1/f < 1.0 \tag{8}$$

Where f1 represents the focal distance (mm) of the first lens.

When the value of f1/f is set to exceed the lower limit of the conditional formula (8), the positive power of the first lens does not become large excessively more than needed too, whereby high order spherical aberration, coma aberration and magnification chromatic aberration which take place at the image side of the first lens can be suppressed to small. On the other hand, when the value of f1/f is set to exceed the lower limit of the conditional formula (8), the positive power of the first lens is secured properly, whereby it becomes possible to make the overall length of the lens short.

In the image pickup lens described in any one of Items 1 to 7, the image pickup lens described in Item 8 is characterized in that the first lens satisfies the following conditional formula (9):

$$3.0<(r2+r1)/(r2-r1)<4.0 \quad (9)$$

Where r1 represents the radius (mm) of curvature of the object side surface of the first lens, and r2 represents the radius (mm) of curvature of the image side surface of the first lens.

The conditional formula (9) specifies a shape factor of the first lens. When the value of the conditional formula (9) is set to exceed the lower limit, a Petzval sum can be made small. On the other hand, when the value of the conditional formula (9) is set to be less the upper limit, the occurrence of spherical aberration can be reduced. The reduction of spherical aberration leads to the reduction of off-axis aberration, whereby high performance can be realized.

Moreover, it is desirable that one of the object side surface and the image side surface of the first lens includes an aspheric surface. When the first lens includes an aspheric surface, the occurrence of spherical aberration can be suppressed to the minimum.

In the image pickup lens described in any one of Items 1 to 8, the image pickup lens described in Item 9 is characterized in that the first lens and the second lens satisfy the following conditional formula (10):

$$0.1<|f1/f2|<0.3 \quad (10)$$

where f1 represents the focal distance (mm) of the first lens and f2 represents the focal distance (mm) of the second lens.

When the value of |f1/f2| is set to exceed the lower limit of the conditional formula (10), on-axis chromatic aberration caused by the first lens can be cancelled by the second lens, whereby high image quality can be realized. Further, when the shortening of the overall length of the lens is tried, the degradation of performance can be suppressed to the minimum. On the other hand, when the value of |f1/f2| is set to be less than the upper limit of the conditional formula (10), the power of the first lens does not become strong excessively as compared with the power of the second lens, whereby various aberrations caused by the first lens can be corrected by the second lens.

In the image pickup lens described in any one of Items 1 to 9, the image pickup lens described in Item 10 is characterized in that an air lens between the first lens and the second lens satisfies the following conditional formula (11):

$$0.7 \leq |fa/f| < 0.8 \quad (11)$$

where fa represents the focal distance (mm) of the air lens between the first lens and the second lens and is obtained by the following formula:

$$fa=r2 \cdot r3/\{r3 \cdot (1-n1)+r2 \cdot (n2-1)-D2 \cdot (1-n1) \cdot (n2-1)\}$$

where r2 represents the radius (mm) of curvature of the image side surface of the first lens, r3 represents the radius (mm) of curvature of the object side surface of the second lens, n1 represents the refractive index of the first lens ford spectral line, n2 represents the refractive index of the second lens ford spectral line, and D2 represents a distance (mm) on the optical axis between the first lens and the second lens.

When the value of |fa/f| is set to exceed the lower limit of the conditional formula (11), since the power of the air lens does not become strong excessively, the image pickup lens becomes a lens in which the deterioration of image quality due to positional deviation between the first lens and the second lens is made small. In addition, the gap between the first lens and the second lens does not become large excessively, whereby the outside portion (flange portion) of an optical surface of the image side surface of the first lens and the outside portion of an optical surface of the object side surface of the second lens can be joined without difficulty. Further, on the other hand, when the value of |fa/f| is set to be less than the upper limit of the conditional formula (11), since the power of the air lens does not become weak excessively, the deterioration of the telecentric property can be prevented. In addition, the gap between the first lens and the second lens does not become small excessively, whereby the outside portion of an optical surface of the image side surface of the first lens and the outside portion of an optical surface of the object side surface of the second lens can be joined without difficulty. With this, the air gap can be controlled by an amount of sag between the center of an optical surface and the outside of the optical surface, whereby the first lens and the second lens can be assembled with high accuracy.

In the image pickup lens described in any one of Items 1 to 10, the image pickup lens described in Item 11 is characterized in that the first lens and the second lens are made of a material having the heat resistance property. As the material having the heat resistance property, a material is not deformed preferably at a temperature of 260° C. or more which is the internal temperature of a reflow vessel.

When the image pickup lens is made of the material having the heat resistance property, since the image pickup lens can endure the reflow process, electronic components and a lens module can be mounted on a base board simultaneously, whereby a lot of the electronic components and the lens module can be mounted on the base board at low cost In the image pickup lens described in any one of Items 1 to 11, the image pickup lens described in Item 12 is characterized in that at least one of the first lens and the second lens is made of glass. With this, a range of choice for the material of lenses increases and high performance can be made easily.

In the image pickup lens described in any one of Items 1 to 11, the image pickup lens described in Item 13 is characterized in that at least one of the first lens and the second lens is made of energy curable type resin. With this, low cost can be made easily.

In the image pickup lens described in Item 13, the image pickup lens described in Item 14 is characterized in that inorganic particles with a size of 30 nanometers or less are dispersed in the resin.

When inorganic fine particles with a size of 30 nanometers or less are dispersed in at least one of the first lens and the second lens made of the resin, if temperature changes, it is possible to reduce the deterioration of performance and the fluctuation of an image taking point. In addition, regardless of environmental change, it is possible to provide an image pickup lens with excellent optical characteristics without reducing light transmittance.

Generally, if fine particles are mixed in a transparent resin material, since transmittance is lowered due to the scattering of light, it is difficult to use the mixed resin material as an optical material. However, when the size of fine particles is made smaller than the wavelength of a transmitting light flux, the scattering of the light flux can be prevented substantially from occurring.

Further, resin materials have a defect that their refractive index is low as compared with glass materials. However, it has turned out that if inorganic fine particle having a high refractive index are dispersed in resin materials becoming a base metal, the refractive index of the resin materials can be made high. Specifically, when inorganic particles having a size of 30 nanometers or less are dispersed in a plastic material becoming a base material or inorganic particles having preferably a size of 20 nanometers or less, more preferably a size of 15 nanometers or less are dispersed in a resin material becoming a base material, it is possible to provide a material having an arbitrary temperature dependency.

Further, when temperature rises, the refractive index of resin materials is lowered. However, it is know that when inorganic particles whose refractive index rises if temperature rises, are dispersed in resin material becoming as a base metal, since the rising refractive index of inorganic particles acts to cancel the lowering refractive index of resin materials, the change of the refractive index for the change of temperature can be made small. In contrast, it is also know that when inorganic particles whose refractive index lowers if temperature rises, are dispersed in resin material becoming as a base metal, the change of the refractive index for the change of temperature can be made large. Specifically, when inorganic particles having a size of 30 nanometers or less are dispersed in a plastic material becoming a base material or inorganic particles having preferably a size of 20 nanometers or less, more preferably a size of 15 nanometers or less are dispersed in a resin material becoming a base material, it is possible to provide a material having an arbitrary temperature dependency.

For example, when fine particles of aluminium oxide ($Al_2O_3$) or lithium niobate ($LiNbO_3$) are dispersed in an acrylic resin, a plastic material with a high refractive index can be obtained and the change of refractive index for a change of temperature can be made small.

Next, the change A of a refractive index for a change of temperature is explained in detail. When a refractive index n is differentiated by temperature t based on the Lorentz Lorentz's formula, the change A of a refractive index for a change of temperature is represented by the following formula.

$$A = \frac{(n^2+2)(n^2-1)}{6n}\left\{(-3\alpha) + \frac{1}{[R]}\frac{\partial [R]}{\partial t}\right\}$$

Where α represents a coefficient of linear expansion and [R] represents molecular refraction.

Generally, in the case of resin materials, as compared with the first term in the above formula, the contribution of the second term is small, and can be almost disregard. For example, in the case of PMMA resin, the coefficient α of linear expansion is $7 \times 10^{-5}$. When the value of the coefficient α is substituted in the above-mentioned formula, it becomes that $dn/dt = -1.2 \times 10^{-4}$ [/° C.], and it almost coincides with an actual measurement value.

Herein, when fine particles, preferably, inorganic fine particles are dispersed in resin materials, the contribution of the second term in the above formula is substantially large such that it cancels the change due to linear expansion of the first term. Specifically, the change is conventionally about $-1.2 \times 10^{-4}$. However, it is desirable to suppress the change to be less than $8 \times 10^{-5}$ as an absolute value.

Moreover, it is also possible to make the contribution of the second term large more such that the mixed resin material is provided with the temperature characteristics reverse to that of the resin material of a base metal. That is, it is possible to obtain such a material that when temperature rises, its refractive index does not lower, but rises conversely.

The mixing ratio can be increased or decreased appropriately in order to control the rate of the change of a refractive index to the change of temperature. Further, it is also possible to blend two or more different kinds of inorganic particles with nanometer sizes and to disperse the blended inorganic particles.

In the image pickup lens described in any one of Items 1 to 14, the image pickup lens described in Item 15 is characterized in that on the last lens surface, the sign of the inclination of the lens surface configuration is made to the same in the region within the effective radius except the center of the lens.

When the sign of the inclination of the lens surface configuration is made to the same in the region within the effective radius except the center of the lens, the processability becomes good at the time of shaping a lens and the accuracy of a surface can be enhanced. In addition, in the surface configuration with the effective radius, in particular, in portions such as convex configuration and concave configuration, when portions where internal stress tends to take place are reduced, the occurrence of birefringence or refractive index distribution can be prevented. Herein, the phrase "the sign of the inclination of the lens surface configuration is made to the same" means that in the case where a direction perpendicular to the optical axis on a cross sectional plane including the optical axis in the image pickup lens is made as a reference direction, a point proceeds along the lens surface configuration from the optical axis to the effective radius side, the direction of a tangent line on each point on the lens surface configuration faces always the same side for the reference direction (the left side or the right side while facing the reference direction). Namely, it means that there is no point of inflexion.

In the image pickup lens described in any one of Items 1 to 15, the image pickup lens described in Item 16 is characterized in that the image pickup lens is produced by a producing method comprising:

a process of forming a first lens block in which the first lens is formed by plural pieces and a second lens block in which the second lens is formed by plural pieces;

a process of making the first lens block and the second lens block in one body by bonding a periphery of an optical surface of the first lens and a periphery of an optical surface of the second lens on the condition that the first lens and the second lens are opposite to each other; and a process of cutting the first lens block and the second lens block made in one body for each of the first lens and the second lens.

According to the producing method of the present invention, the image pickup lens capable of forming a highly precise image can be produced cheaply with mass-volume.

An image pickup device described in Item 17 is characterized by being provided with the image pickup lens described in any one of Items 1 to 16.

With this, it is possible to provide an image pickup device corresponding to image pickup elements which has a high performance with a small size and comprises high density pixels.

A mobile terminal device described in Item 18 is characterized by being provided with the image pickup device described in Item 17.

With this, it is possible to provide a mobile terminal device provided with the image pickup device corresponding to image pickup elements which has a high performance with a small size and comprises high density pixels.

According to the present invention, it is possible to provide an image pickup lens which corrects chromatic aberration up to a peripheral region of an image taking plane with a small number of lenses and corresponds to image pickup elements which has a high performance with a small size and comprises high density pixels, and an image pickup device and a mobile terminal device which employs the image pickup lens.

BRIEF DESCRIPTION OF THE DRAWINGS

FIGS. 3a and 3b each is a drawing showing the condition that the image pickup device 50 is incorporated in a mobile telephone 100 as a mobile terminal device.

FIG. 11 is a cross sectional view of the image pickup lens shown in Embodiment 2.

FIGS. 12a, 12b and 12c each is an aberration diagram (spherical aberration, astigmatism, distortion aberration) of the image pickup lens shown in Embodiment 2.

FIG. 23 is a cross sectional view of the image pickup lens shown in Embodiment 6.

FIGS. 24a, 24b and 24c each is an aberration diagram (spherical aberration, astigmatism, distortion aberration) of the image pickup lens shown in Embodiment 6.

FIG. 35 is a cross sectional view of the image pickup lens shown in Embodiment 10.

FIGS. 36a, 36b and 36c each is an aberration diagram (spherical aberration, astigmatism, distortion aberration) of the image pickup lens shown in Embodiment 10.

DETAILED DESCRIPTION OF THE PREFERRED EMBODIMENTS OF THE PRESENT INVENTION

Figure 1:
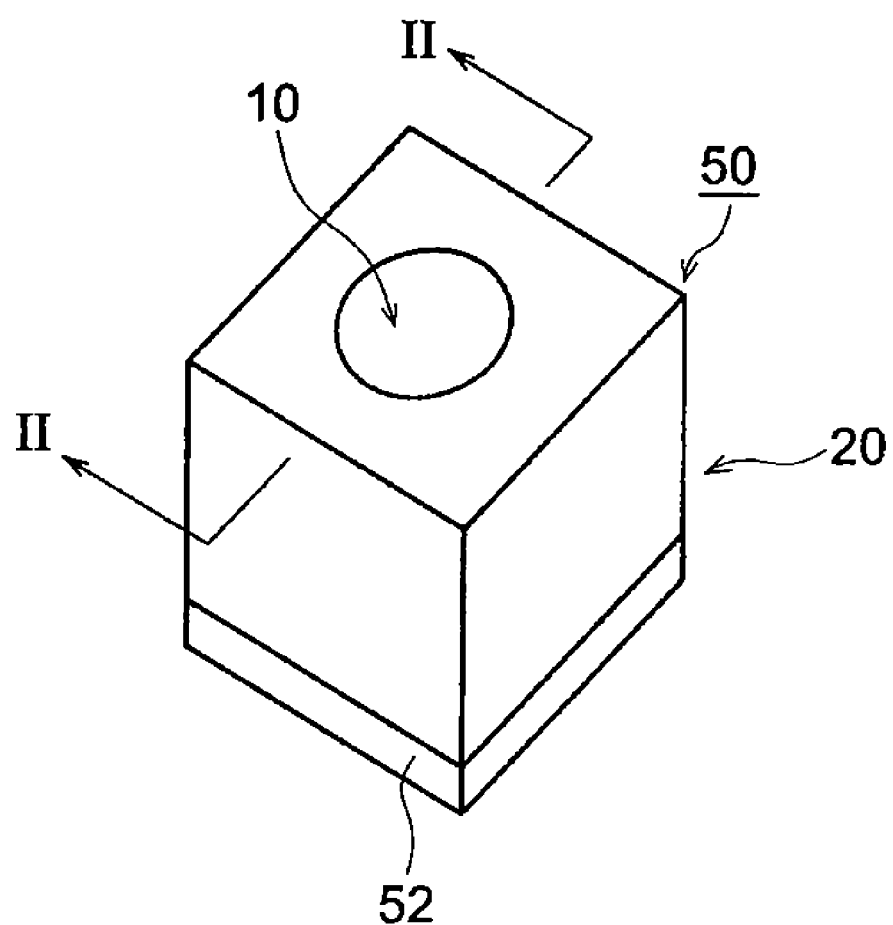
FIG. 1 is a perspective view of an image pickup device 50 according to the present embodiment
Figure 2:
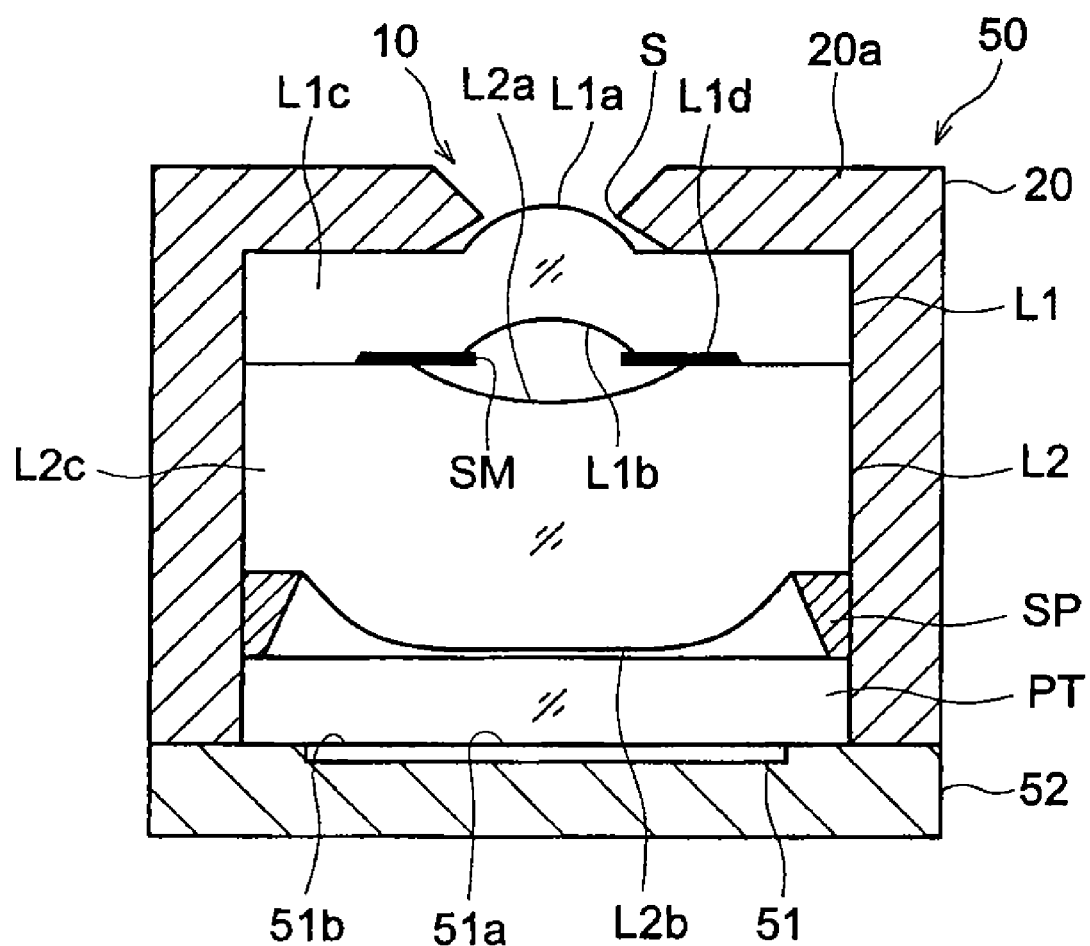
FIG. 2 is a cross sectional view in which the structure of FIG. 1 is cut at a plane passing the optical axis and looked from an arrowed II-II line.

Hereafter, the preferred embodiments of the present invention will be described with reference to the drawings. However, the present invention is not limited to these embodiments. FIG. 1 is a perspective view of an image pickup device 50 according to the present embodiment, and FIG. 2 is a cross sectional view in which the structure of FIG. 1 is cut at a plane passing the optical axis and looked from an arrowed II-II line. As shown in FIG. 2, the image pickup device 50 is equipped with a CMOS type image sensor 51 including a photoelectrical convertor section 51a and acting as a solid state image pickup element an image pickup lens 10 to form an image of a photographic object on the photoelectrical convertor section 51a of this image sensor 51; and a base board 52 to hold the image sensor 51 and having a terminal for external connection (not-shown) to send and receive electric signals, wherein these components are formed in one body. Herein, the image pickup lens 10 is held by a casing body 20 and comprises, in the order from the object side, an aperture stop S, a first lens L1, and a second lens L2.

In the image sensor 51, formed is the photoelectrical converter section 51a as a light receiving section on which pixels (photoelectric conversion elements) are arranged in a two dimensional arrangement at the central section of a plane at its light receiving side, and a signal processing circuit 51b is formed at its peripheral region. This signal processing circuit 51b is constituted by a drive circuit section to drive each pixel one by one so as to obtain a signal charge; an A/D conversion section to convert each signal charge into a digital signal; a signal processing section part to form image signal outputs by the use of this digital signal, and so on. Further, a number of pads (not shown) are arranged in the vicinity of the outer periphery of the plane at the light receiving side of the image sensor 51 and are connected to the base board 52 through wires (not shown). The image sensor 51 converts the signal charges from the photoelectrical converter section 51a into image signals, such as digital YUV signals and outputs them to a predetermined circuit on the base board 52 through wires (not-shown). Herein, Y represents luminance signals, U (=R−Y) represents color difference signals of red and the luminance signals, and V (=B−Y) represents color difference signals of blue and the luminance signals. The solid state image pickup elements are not limited to the above-mentioned CMOS type image sensor, and the other sensor, such as CCD may be employed for them.

The base board 52 which supports the image sensor 51 is connected to the image sensor by wiring (not-shown) so as to be able to conduct communication.

The base board 52 is connected with external circuits (for example, control circuits included in a higher-level device of the mobile terminal device in which the image pickup device is mounted) through terminals for external connection (not-shown) so that it becomes possible to receive voltage and clock signals to drive the image sensor 51 from an external circuit and to output digital YUV signals to an external circuit.

The upper part of the image sensor 51 is sealed by a parallel plate PT, such as an infrared ray cut filter, which is fixed on the upper face of the base board 52. The image pickup lens 10 is arranged above the parallel plate PT. Specifically, in the inside of the cylindrical casing body 20 whose lower end is brought in contact with the top surface of the base board 52, the first lens L1, a light shielding mask SM, the second lens L2, a ring-shaped spacer SP, and the parallel plate PT are arranged in this order from the upper portion and fixed. In the upper portion of the casing body 20, formed is a flange section 20a which has an aperture in its center, and the inner circumference of the aperture constitutes the aperture stop S. Further, in contact with the lower surface of the flange section 20a, brought is the upper surface of a flange section L1c which is extended into a direction perpendicular to the optical axis from the periphery of the optical surfaces L1a, L1b of the first lens L1. On the condition that a light shielding mask is accommodated in a ring-shaped receptacle section formed on the lower surface of the flange section L1e, in contact with the lower surface of the flange section L1c at the outer side in the direction perpendicular to the optical axis, brought is the upper surface of the flange section L2c which is extended in the direction perpendicular to the optical axis from the periphery of the optical surfaces L2a and L2b of the second lens L2.

The first lens L1 is a positive meniscus lens which has a convex surface at the object side and a concave surface at the image side, the second lens L2 is a negative meniscus lens which has a concave surface at the object side and a convex surface at the image side, and the last lens surface is provided with an aspheric surface to make a positive power strong toward a lens peripheral region. However, the second lens L2 may be made as a lens which has a concave surface at the object side and an image side surface whose paraxial radius of curvature is infinite or negative. Further, the image pickup lens satisfies the following conditional formulas:

$$1.55 < n1 < 1.80 \tag{1}$$

$$0.4 < D3/f < 0.6 \tag{2}$$

$$40.0 < v2 < 90.0 \tag{3}$$

where n1 represents a refractive index of the first lens ford spectral line, D3 represents a core thickness (a thickness on the optical axis) (mm) of the second lens, f represents a focal distance (mm) of the entire system, and v2 represents of an Abbe's number of the second lens.

The working modes of the image pickup device 50 mentioned above will be explained. FIGS. 3a and 3b each is a drawing showing the condition that the image pickup device 50 is incorporated in a mobile telephone 100 as a mobile terminal device. Further, FIG. 4 is a control block diagram of the mobile telephone 100.

For example, the image pickup device 50 is arranged at a position corresponding to the lower portion of a liquid crystal display section of the mobile telephone 100 in such a way that the object side end surface of the image pickup lens 10 is provided to the back surface (assuming that the liquid crystal display side is the front surface) of the mobile telephone 100.

The terminals for external connection (not-shown) of the image pickup device 50 are connected with the control section 101 of the mobile telephone 100, and image signals such as luminance signals and color difference signals are outputted to the control-section 101 side through the terminals.

Figure 4:
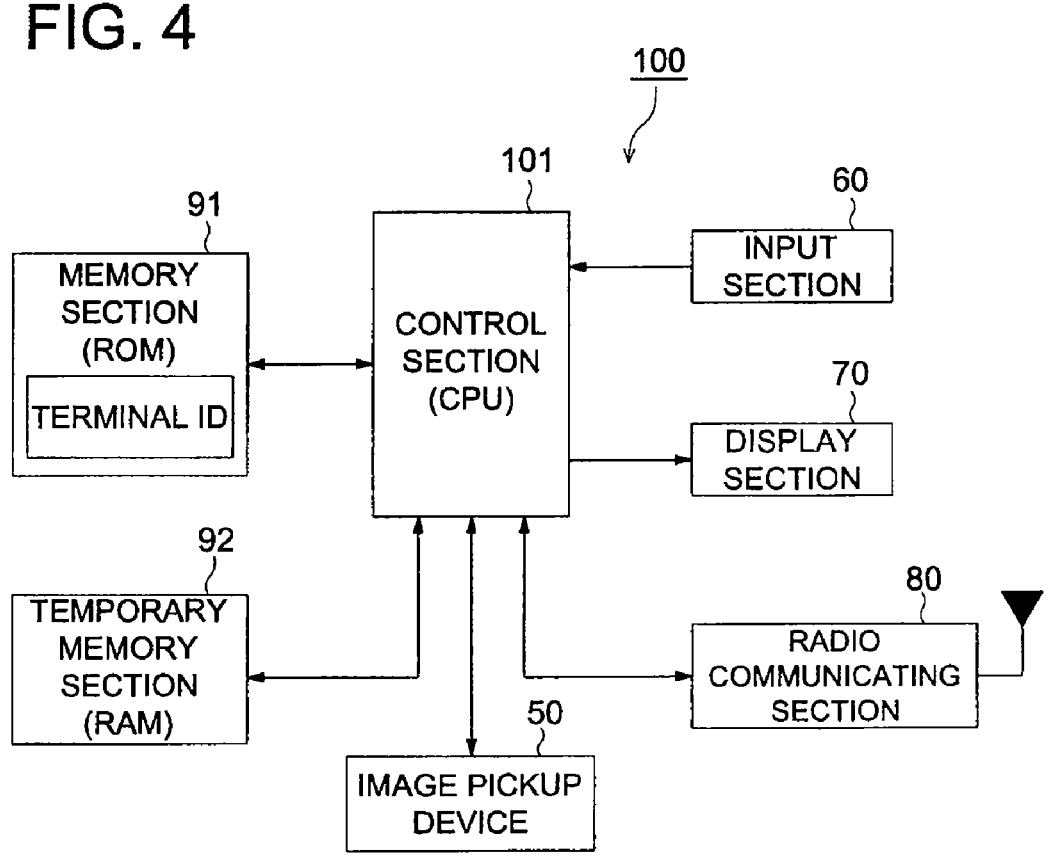
FIG. 4 is a control block diagram of the mobile telephone 100.

On the other hand, as shown in FIG. 4, the mobile telephone 100 comprises the control section (CPU) 101 to control overall each section and to execute programs in accordance with each processing; an input section 60 to input numbers by a key; a display section 70 to display photographed images, video pictures, and the like; a radio communication section 80 to realize various kinds of information communication between the mobile telephone 100 and external servers; a memory section (ROM) 91 to memorize system programs of the mobile telephone 100, various processing programs and required various data, such as a Terminal ID; and a temporary memory section (RAM) 92 used as working areas to store temporarily various processing programs executed by the control section 101, data or processing data, image pickup data by the image pickup device 50.

When a photographer who grips the mobile telephone 100 makes the image pickup lens 10 of the image pickup device 50 to face a photographic object, image signals of a still image or a motion picture are picked up into the image sensor 51. That is, when the photographer presses a button T shown in FIG. 3a at a desired shutter chance, a shutter is released such that image signals are picked up into the image pickup device 50.

The image signals inputted from the image pickup device 50 are transmitted to a control system of the mobile telephone 100, and then are memorized in the memory section 92, and displayed on the display section 70. Further, the image signals may be transmitted as picture information to outside through the radio communication section 80.

Figure 5:
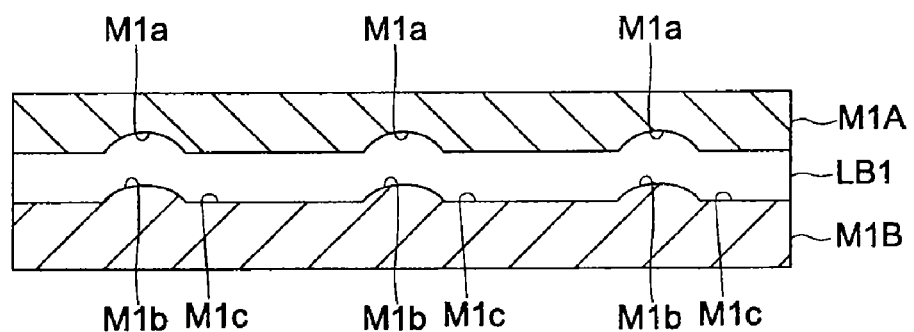
FIG. 5 is an illustration showing a production process of a first block LB1.
Figure 6:
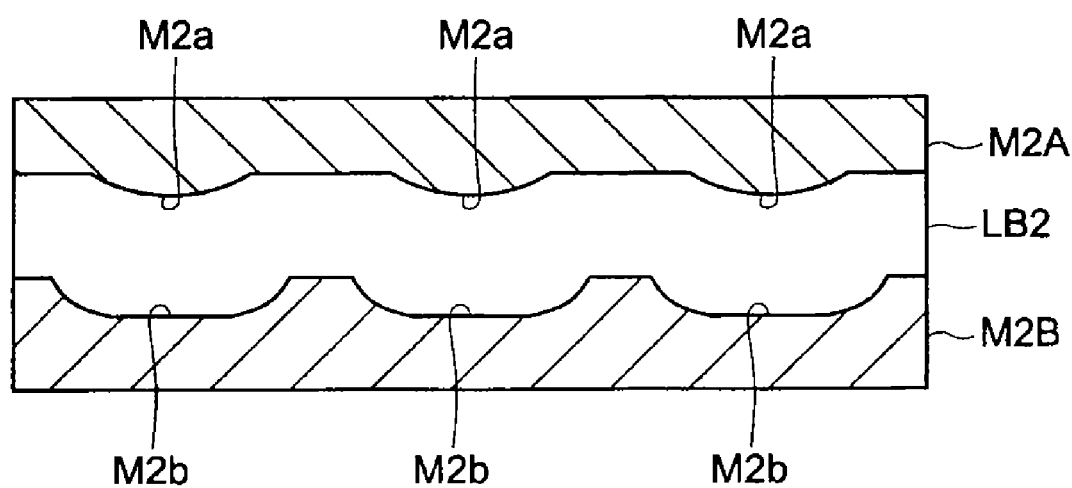
FIG. 6 is an illustration showing a production process of a second block LB2.

The production method of the image pickup lens according to this embodiment will be explained. FIGS. 5 to 7 are illustrations showing the processes of manufacturing the image pickup lens according to this embodiment. First, as shown in FIG. 5, between a metal mold M1A on which a plurality of optical surface transferring surfaces M1a are arranged in a matrix form or in a line and a metal mold M1B on which a plurality of optical surface transferring surfaces M1b are arranged in a matrix form or in a line and a plurality of receiving section transferring surfaces M1c are arranged in the vicinity of the plurality of optical surface transferring surfaces M1b, a glass parallel plate is sandwiched and heated to melt the surface of the glass parallel plate, whereby the glass parallel plate is made to a first lens block LB1 such that optical surfaces L1a corresponding to the optical surface transferring surfaces M1a are formed on its one surface and optical surfaces L1b corresponding to the optical surface transferring surfaces M1b and receiving sections L1d corresponding to the receiving section transferring surfaces M1c are formed on its another surface (refer to FIG. 7a).

Figure 7A:
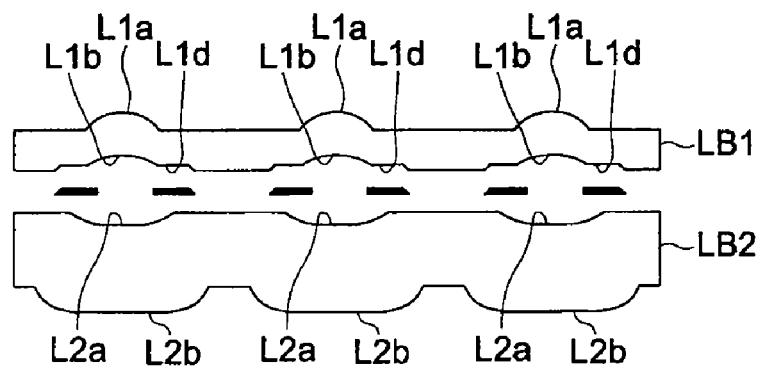
FIGS. 7a, 7b, 7c and 7d each is an illustration showing a production process of a lens block LB2.
Figure 7B:
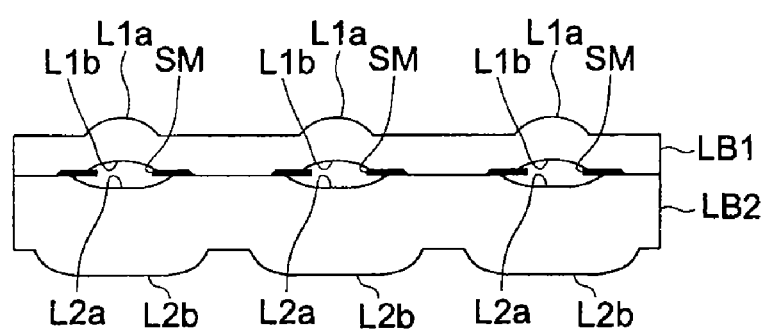

In parallel to the above process, as shown in FIG. 6, between a metal mold M2A on which a plurality of optical surface transferring surfaces M2a are arranged in a matrix form or in a line and a metal mold M2B on which a plurality of optical surface transferring surfaces M2b are arranged in a matrix form or in a line, a glass parallel plate is sandwiched and heated to melt the surface of the glass parallel plate, whereby the glass parallel plate is made to a second lens block LB2 such that optical surfaces L2a corresponding to the optical surface transferring surfaces M2a are formed on its one surface and optical surfaces L2b corresponding to the optical surface transferring surfaces M2b are formed on its another surface (refer to FIG. 7b).

Then, the first lens block LB1 and the second lens block LB2 produced by the above processes are laminated so as to produce image pickup lenses 10. One example of this image pickup lens producing process is shown in outline cross sectional views of FIG. 7b.

First, as shown in FIG. 7a, on the condition that doughnut plate-shaped light shielding masks SM are arranged on the receiving sections L1d of the first lens block LB1 respectively, the first lens block LB1 and the second lens block LB2 are aligned such that the optical axis of the optical surfaces L1a, L1b and the optical axis of the optical surfaces L2a, L2b are made to coincide with each other. Herein, as example of a method of aligning the optical axis, a position reference mark to be observed as a feature point different in brightness from other parts is provided on each of the first lens block LB1 and the second lens block LB2 (for example, a microscopic concave portion is formed on a transferring surface of a metal mode and then a microscopic convex portion is formed on a lens block at the time of molding), the position of the feature point in an observation coordinate system is calculated through the optical observation for the feature point, and the positional adjustment is conducted such that the positions of the feature points on both the first lens block LB1 and the second lens block LB2 are made to coincident with each other, whereby the optical axis of the optical surfaces L1a, L1b and the optical axis of the optical surfaces L2a, L2b are made to coincident with each other precisely (refer to Japanese Unexamined Patent Publication No. 2006-146043).

Figure 7C:
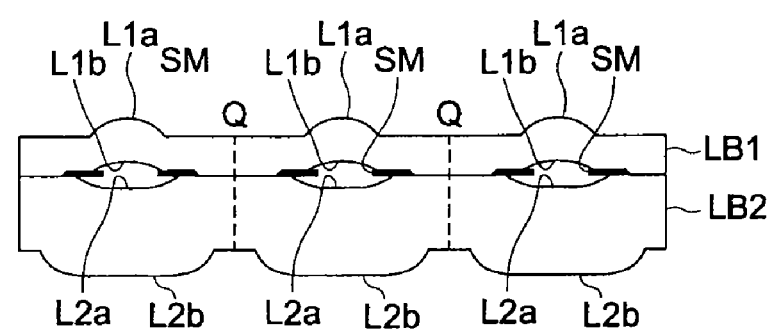
Figure 7D:
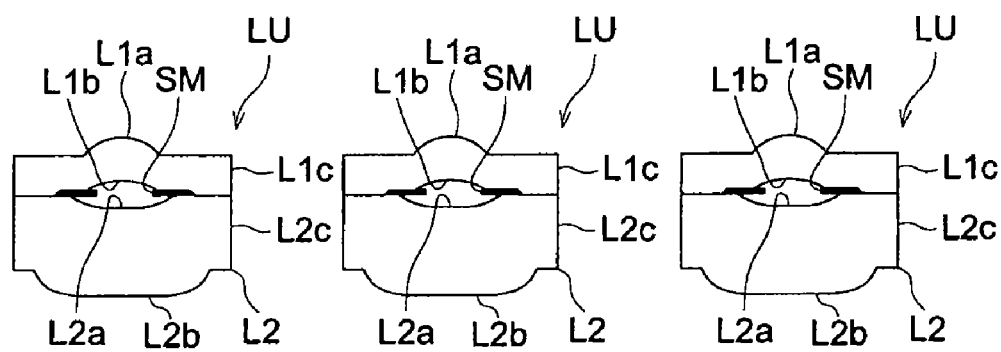

Then, as shown in FIG. 7b, the first lens block LB1 and the second lens block LB2 are bonded with adhesive. With this, the first lens block LB1 and the second lens block LB2 are made a single body on the condition that the light shielding masks SM are incorporated between them. After the adhesive became solidified, the single body of the first lens block LB1 and the second lens block LB2 is cut along positions indicated with broken lines Q as shown in FIG. 7c, whereby a plurality of lens units LU each having an integrated two lens structure are formed effectively (refer to FIG. 7d). The cut-out portions become flange sections L1c of the first lens L1 and flange sections L2c of the first lens L2. Thereafter, the lens unit LU is incorporated in the casing body 20, whereby the image pickup lens 10 is structured so that an image pickup device shown in FIG. 2 can be obtained.

In such a way, when a member in which the first lens block LB1 and the second lens block LB2 are integrated into a single body is cut out, lens units being a structural element of the image pickup lens are produced, whereby the adjustment of the distance between lenses and the assembling of the lenses as the image pickup lens can be simplified. Further, since the flange sections L1c of the first lens and the flange sections L2c of the second lens are brought in direct contact with each other, the distance between lenses can be secured precisely. As a result, the image pickup device expected high image quality can be produced in large volume. Herein, three or more lens blocks may be connected. The first lens block LB1 and the second lens block LB2 may be made of a heat curable resin or a UV curable resin.

EXAMPLE

Herein, examples suitable to the present embodiments will be explained. Symbols used in these examples are as follows.
f: Focal length of the entire system of an image pickup lens
Fno: F number
2Y: Length of a diagonal line on an image pickup
    Surface of a solid state image pickup element
w Half angle of field
TL Distance on the optical axis from a most object side lens surface of the entire system of an image pickup lens to an image side focal point
BF Back focus
r Radius of curvature
d On-axis surface gap
nd Refractive index of a lens material ford spectral line
vd Abbe's number of a lens material ford spectral line The F number and the half angle of field described in construction data tables 1 to 9 in the following Examples 1 to 9 are effective values on a finite object distance, that is, an object distance shown in tables. Further, the back focus is an effective value on the object distance, and further is a value calculated on the condition that a parallel plate portion arranged between the most image side surface and the position of the image side focal point is made to an air equivalent distance. TL is a distance in which the back focus is added to a distance from the most object side lens surface to the most image side lens surface.

In the present examples, a configuration of an aspherical surface is represented by "Numeral 2", where in a rectangular coordinate system in which an apex of a surface is made as an original point and the optical axis direction is made as X axis, h represents a height from the optical axis, R represents a radius of curvature, K represents a conical constant, and Ai represents an i-th order aspherical surface coefficient.

$$X = \frac{h^2/R}{1 + \sqrt{1-(1+K)h^2/R^2}} + \sum A_i h^i \quad \text{[Numeral 2]}$$

Example 1

Figure 8:
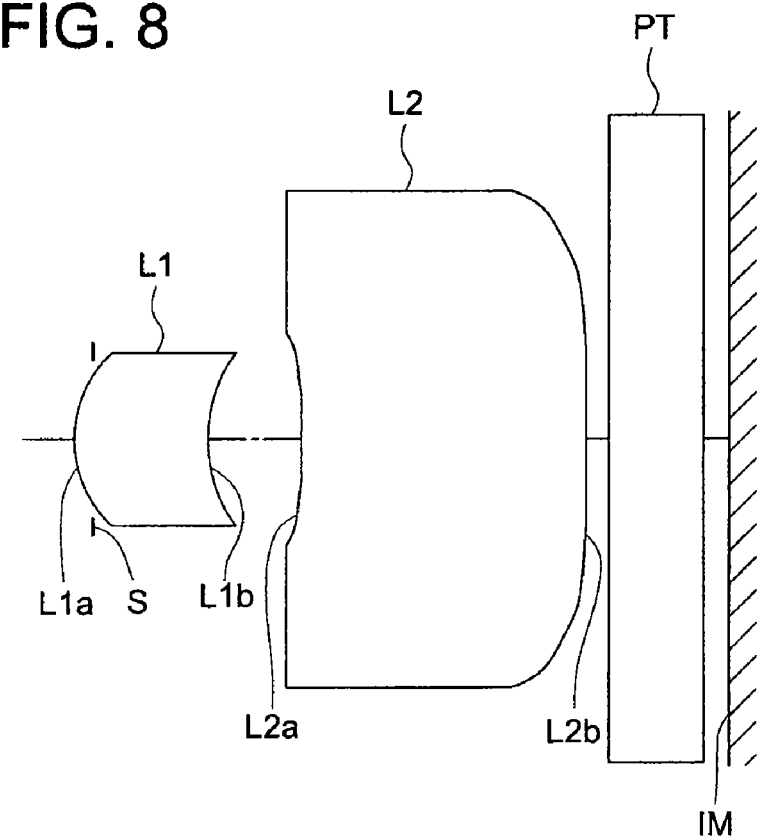
FIG. 8 is a cross sectional view of the image pickup lens shown in Embodiment 1.
Figure 9A:
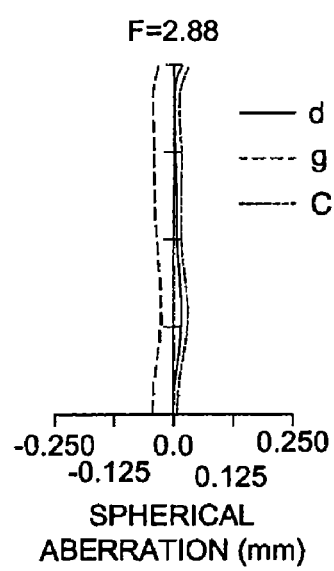
FIGS. 9a, 9b and 9c each is an aberration diagram (spherical aberration, astigmatism, distortion aberration) of the image pickup lens shown in Embodiment 1.
Figure 9B:
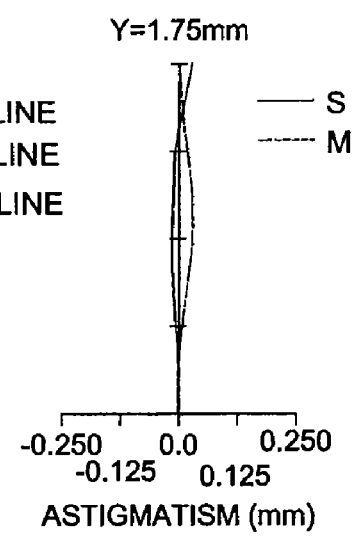
Figure 9C:
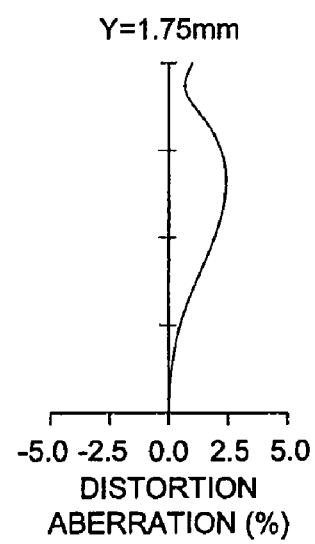
Figure 10:
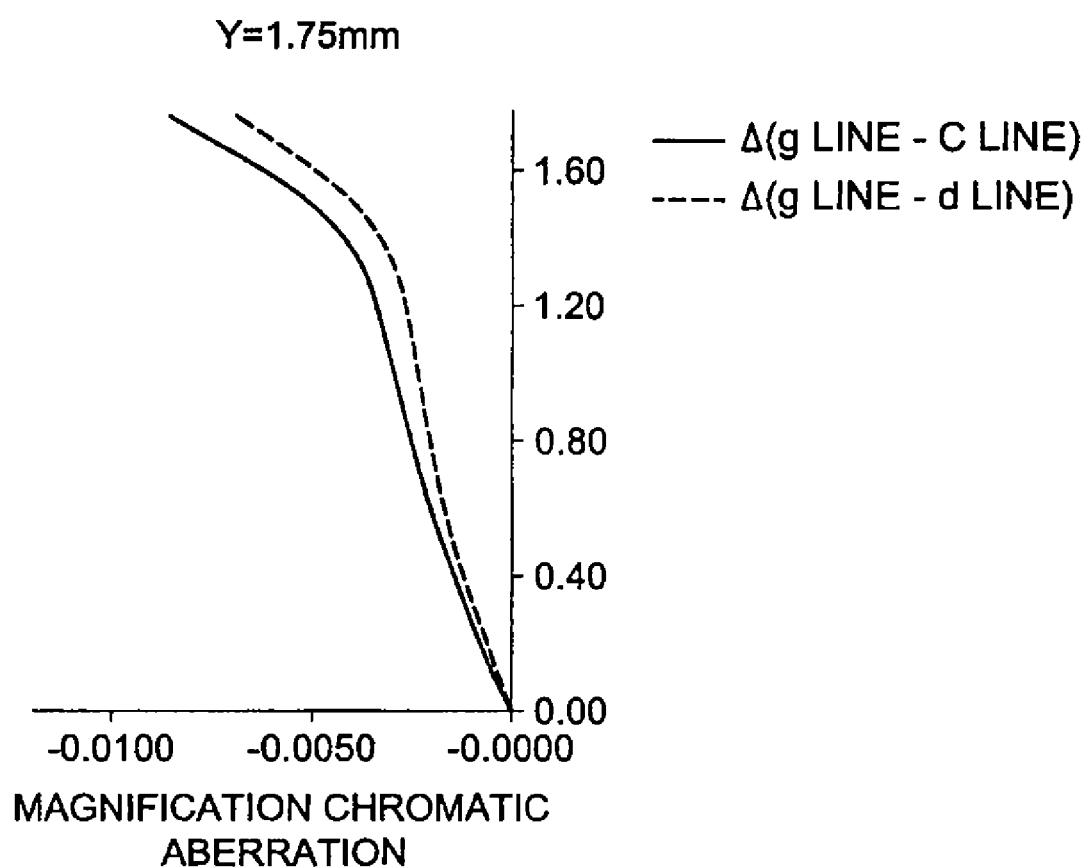
FIG. 10 is a magnification chromatic aberration diagram of the image pickup lens shown in Embodiment 1

The lens data of Example 1 are shown in Table 1. FIG. 8 is a cross sectional view of the image pickup lens of Example 1. FIG. 9 shows aberration diagrams (spherical aberration (FIG. 9a), astigmatism (FIG. 9b), distortion aberration (FIG. 9c)) of Example 1. FIG. 10 is a magnification chromatic aberration diagram of Example 1. Here, in the spherical aberration diagram, a solid line indicates a spherical aberration amount for d spectral line, a broken line indicates a spherical aberration amount for g spectral line, and a dotted line indicates a spherical aberration amount for c spectral line, respectively. Further, in the astigmatism aberration diagram, a solid line indicates a sagittal surface and a dotted line indicates a meridional surface, and in the magnification chromatic aberration diagram, a solid line indicates the difference between g spectral line and C spectral line, and a dotted line indicates the difference of g spectral line and d spectral line, respectively (hereafter, it is the same). The image pickup lens of Example 1 comprises, in the order from the object side, an aperture stop S, a positive meniscus lens L1 having a convex optical surface L1a at the object side and a concave optical surface L1b at the image side, a negative meniscus lens L2 having a concave optical surface L2a at the object side and a convex optical surface L2b at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

TABLE 1

Example 1
CONSTRUCTION DATA
Reference Wave Length = 587.56 nm
unit: mm
Construction data

| NUM. | r | d | nd | vd | Effective radius |
|---|---|---|---|---|---|
| object | infinity | 1000.000 | | | |
| 1 (stop) | infinity | 0.050 | | | 0.982 |
| 2 | infinity | −0.155 | | | 1.010 |
| 3* | 0.890 | 0.699 | 1.59340 | 68.30 | 1.023 |
| 4* | 1.625 | 0.479 | | | 1.005 |
| 5* | −7.040 | 1.521 | 1.77200 | 50.00 | 1.399 |
| 6* | −255.038 | 0.127 | | | 2.937 |
| 7 | infinity | 0.500 | 1.51633 | 64.14 | 3.237 |
| 8 | infinity | 0.143 | | | 3.468 |
| image | infinity | | | | |

| | ASPHERICAL SURFACE |
|---|---|
| 3 | K = −1.22504e+001, A4 = 2.06948e+000, A6 = −9.25630e+000, A8 = 3.68934e+001, A10 = −8.36135e+001, A12 = 8.05948e+001, A14 = 0.00000e+000, A16 = 0.00000e+000, A18 = 0.00000e+000, A20 = 0.00000e+000 |
| 4 | K = −2.14911e−001, A4 = 3.56805e−001, A6 = −5.99638e+000, A8 = 1.25959e+001, A10 = −5.25580e+001, A12 = 8.86807e+001, A14 = 1.47180e+002, A16 = −3.19748e+002, A18 = 0.00000e+000, A20 = 0.00000e+000 |
| 5 | K = −2.88113e+001, A4 = −1.68021e−001, A6 = −5.16072e−001, A8 = 2.20815e+000, |

TABLE 1-continued

Example 1
CONSTRUCTION DATA
Reference Wave Length = 587.56 nm
unit: mm
Construction data

| | |
|---|---|
| | A10 = −6.18519e+000, A12 = 6.22644e+000, A14 = 0.00000e+000, A16 = 0.00000e+000, A18 = 0.00000e+000, A20 = 0.00000e+000 |
| 6 | K = 2.22142e+001, A4 = −1.00307e−002, A6 = −3.73346e−002, A8 = 1.43413e−002, A10 = −7.17488e−003, A12 = 1.62327e−003, A14 = 0.00000e+000, A16 = 0.00000e+000, A18 = 0.00000e+000, A20 = 0.00000e+000 |

| | |
|---|---|
| FL | 2.831 |
| Fno | 2.880 |
| w | 31.272 |
| y max | 1.750 |
| TL | 3.307 |
| BF | 0.608 |

| Elem | Surfs | Focal Length |
|---|---|---|
| 1 | 3-4 | 2.445 |
| 2 | 5-6 | −9.404 |

Example 2

Figure 13:
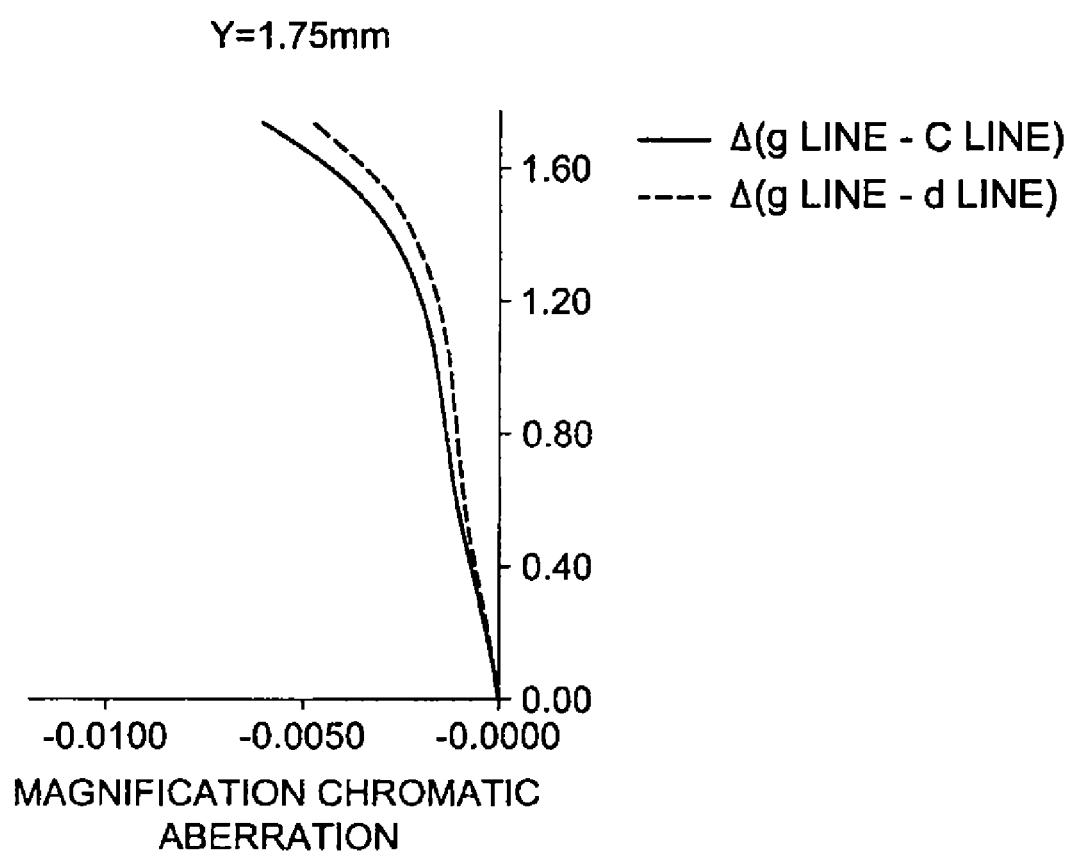
FIG. 13 is a magnification chromatic aberration diagram of the image pickup lens shown in Embodiment 2.

The lens data of Example 2 are shown in Table 2. FIG. 11 is a cross sectional view of the image pickup lens of Example 1. FIG. 12 shows aberration diagrams (spherical aberration (FIG. 12a), astigmatism (FIG. 12b), distortion aberration (FIG. 12c)) of Example 2. FIG. 13 is a magnification chromatic aberration diagram of Example 2. The image pickup lens of Example 2 comprises, in the order from the object side, an aperture stop S, a positive meniscus lens L1 having a convex optical surface L1a at the object side and a concave optical surface L1b at the image side, a negative meniscus lens L2 having a concave optical surface L2a at the object side and a convex optical surface L2b at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

TABLE 2

Example 2
CONSTRUCTION DATA
Reference Wave Length = 587.56 nm
unit: mm
Construction data

| NUM. | r | d | nd | vd | Effective radius |
|---|---|---|---|---|---|
| object | infinity | 1000.000 | | | |
| 1 (stop) | infinity | 0.050 | | | 0.996 |
| 2 | infinity | −0.150 | | | 0.996 |
| 3* | 0.864 | 0.694 | 1.58313 | 59.44 | 1.020 |
| 4* | 1.548 | 0.441 | | | 1.001 |
| 5* | −5.799 | 1.340 | 1.58313 | 59.44 | 1.293 |
| 6* | −120.010 | 0.183 | | | 2.752 |
| 7 | infinity | 0.500 | 1.51633 | 64.14 | 3.112 |
| 8 | infinity | 0.114 | | | 3.394 |
| image | infinity | | | | |

| | Aspherical Coefficients |
|---|---|
| 3 | K = −6.25530e+000, A4 = 1.23060e+000, A6 = −3.32460e+000, A8 = 1.08930e+001, |

TABLE 2-continued

Example 2
CONSTRUCTION DATA
Reference Wave Length = 587.56 nm
unit: mm
Construction data

| | |
|---|---|
| 4 | A10 = −1.56500e+001, A12 = 1.91780e+000, A14 = 0.00000e+000, A16 = 0.00000e+000, A18 = 0.00000e+000, A20 = 0.00000e+000 K = −1.24390e+001, A4 = 7.80850e−001, A6 = 1.20380e−001, A8 = −7.80990e+000, A10 = 4.29610e+001, A12 = 3.29770e+001, A14 = −1.28820e+002, A16 = −3.72940e+002, A18 = 0.00000e+000, A20 = 0.00000e+000 |
| 5 | K = 4.63420e+001, A4 = −1.97290e−001, A6 = −6.71930e−001, A8 = 7.35290e−001, A10 = 7.69950e+000, A12 = −3.25270e+001, A14 = 3.24270e+001, A16 = −4.24880e+000, A18 = 5.32570e+000, A20 = 3.02390e+001 |
| 6 | K = 4.99130e+001, A4 = 1.71320e−002, A6 = −1.14110e−001, A8 = 6.12060e−002, A10 = −1.82470e−002, A12 = 1.38830e−003, A14 = −4.79750e−005, A16 = −2.54390e−005, A18 = 2.11630e−006, A20 = 4.58190e−006 |

| | |
|---|---|
| FL | 2.794 |
| Fno | 2.800 |
| w | 31.257 |
| y max | 1.750 |
| TL | 3.102 |
| BF | 0.627 |

| Elem | Surfs | Focal Length |
|---|---|---|
| 1 | 3-4 | 2.442 |
| 2 | 5-6 | −10.495 |

Example 3

Figure 14:
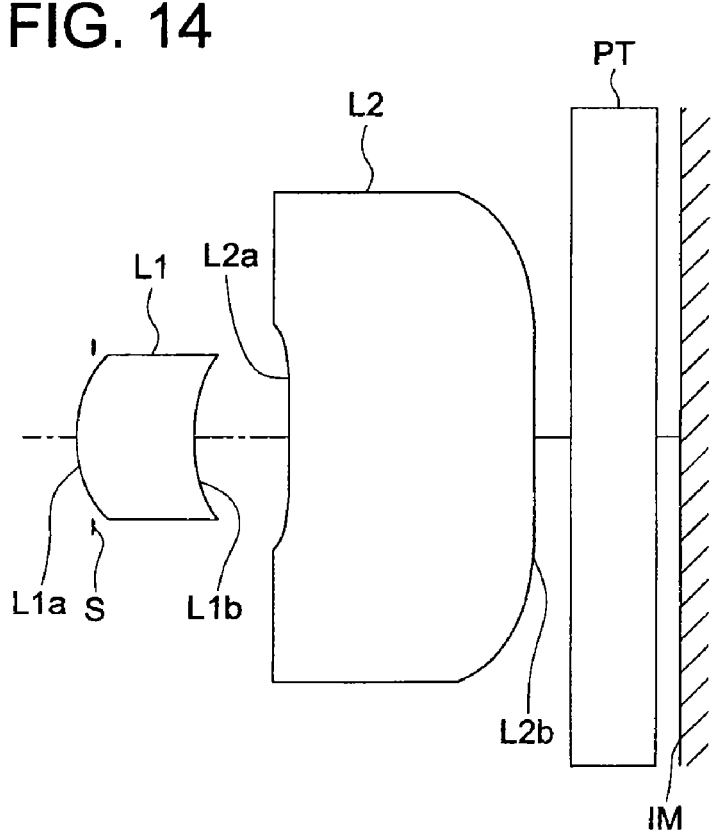
FIG. 14 is a cross sectional view of the image pickup lens shown in Embodiment 3.
Figure 15A:
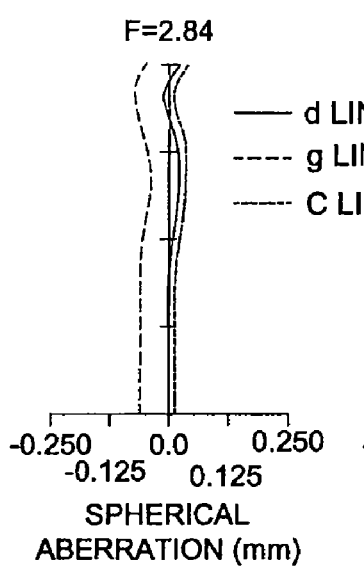
FIGS. 15a, 15b and 15c each is an aberration diagram (spherical aberration, astigmatism, distortion aberration) of the image pickup lens shown in Embodiment 3.
Figure 15B:
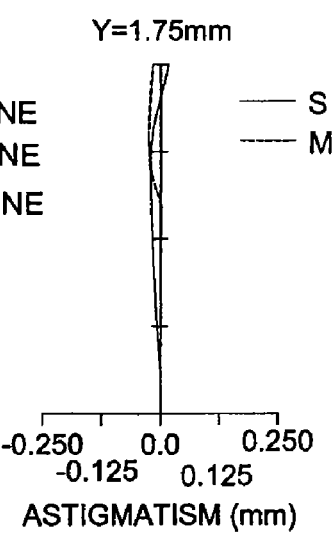
Figure 15C:
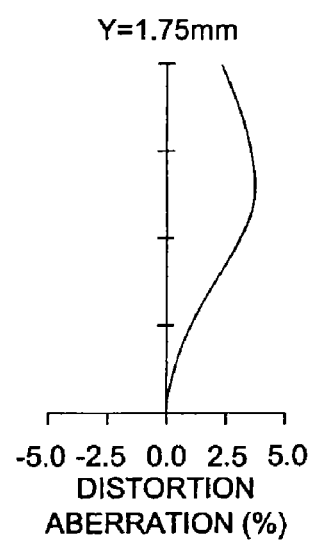
Figure 16:
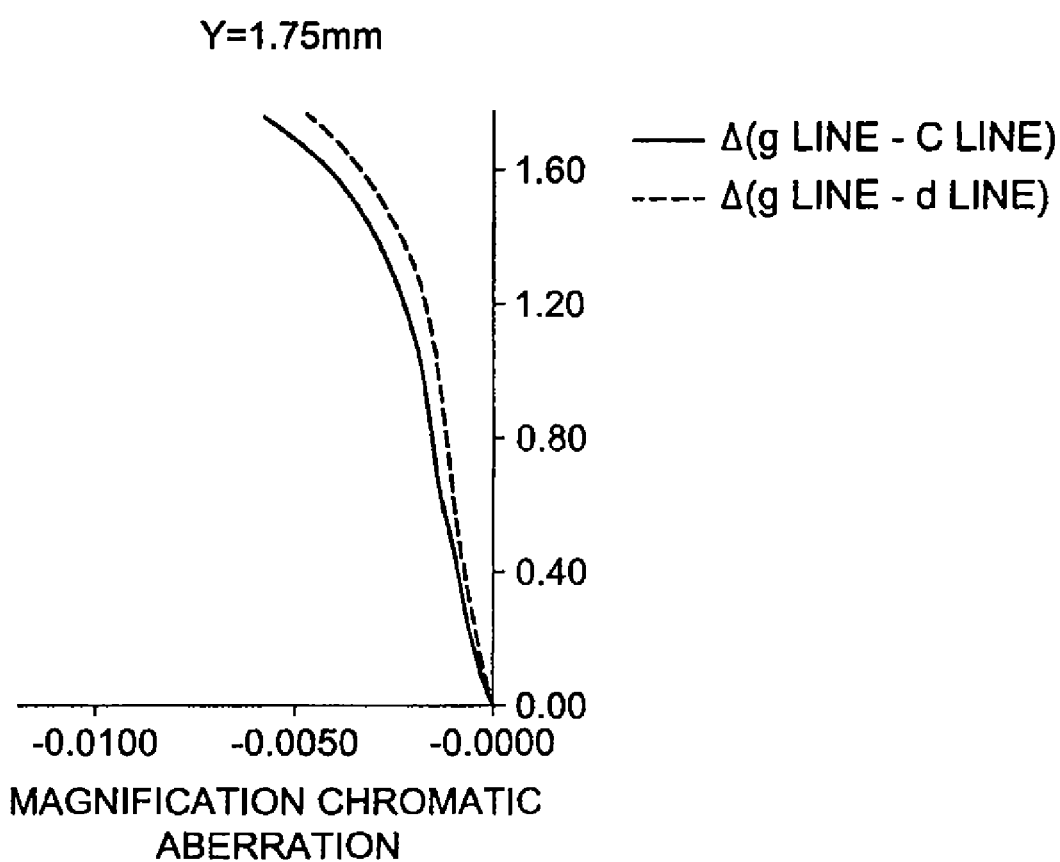
FIG. 16 is a magnification chromatic aberration diagram of the image pickup lens shown in Embodiment 3.

The lens data of Example 3 are shown in Table 3. FIG. 14 is a cross sectional view of the image pickup lens of Example 3. FIG. 15 shows aberration diagrams (spherical aberration (FIG. 15*a*), astigmatism (FIG. 15*b*), distortion aberration (FIG. 15*c*)) of Example 3. FIG. 16 is a magnification chromatic aberration diagram of Example 3. The image pickup lens of Example 3 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

TABLE 3

Example 3
CONSTRUCTION DATA
Reference Wave Length = 587.56 nm
unit: mm
Construction data

| NUM. | r | d | nd | vd | Effective radius |
|---|---|---|---|---|---|
| object | infinity | 1000.000 | | | |
| 1 (stop) | infinity | 0.050 | | | 0.992 |
| 2 | infinity | −0.147 | | | 0.992 |
| 3* | 0.871 | 0.694 | 1.58313 | 59.44 | 1.018 |
| 4* | 1.564 | 0.431 | | | 1.001 |
| 5* | −5.838 | 1.390 | 1.58313 | 59.44 | 1.295 |
| 6* | −120.010 | 0.166 | | | 2.818 |
| 7 | infinity | 0.500 | 1.51633 | 64.14 | 3.191 |
| 8 | infinity | 0.136 | | | 3.493 |
| image | infinity | | | | |

Aspherical Coefficients

| | |
|---|---|
| 3 | K = −6.16380e+000, A4 = 1.22230e+000, A6 = −3.28700e+000, A8 = 1.05590e+001, A10 = −1.54270e+001, A12 = 4.49320e+000, A14 = 0.00000e+000, A16 = 0.00000e+000, A18 = 0.00000e+000, A20 = 0.00000e+000 |
| 4 | K = −1.25130e+001, A4 = 7.72230e−001, A6 = 1.35830e−001, A8 = −7.74310e+000, A10 = 4.12920e+001, A12 = 3.46570e+001, A14 = −1.20130e−002, A16 = −3.56560e+002, A18 = 0.00000e+000, A20 = 0.00000e+000 |
| 5 | K = 4.30170e+001, A4 = −1.87570e−001, A6 = −7.26920e−001, A8 = 1.00850e+000, A10 = 7.41660e+000, A12 = −3.21280e+001, A14 = 3.07760e+001, A16 = −3.29380e+000, A18 = 7.59680e+000, A20 = 2.83590e+001 |
| 6 | K = −5.00000e+001, A4 = 1.89710e−002, A6 = −9.96470e−002, A8 = 4.20110e−002, A10 = −5.96200e−003, A12 = −1.32740e−003, A14 = −1.26800e−005, A16 = 1.31120e−006, A18 = 4.76060e−006, A20 = 4.13520e−006 |

| | |
|---|---|
| FL | 2.822 |
| Fno | 2.841 |
| w | 31.251 |
| y max | 1.750 |
| TL | 3.147 |
| BF | 0.632 |

| Elem | Surfs | Focal Length |
|---|---|---|
| 1 | 3-4 | 2.461 |
| 2 | 5-6 | −10.571 |

Example 4

Figure 17:
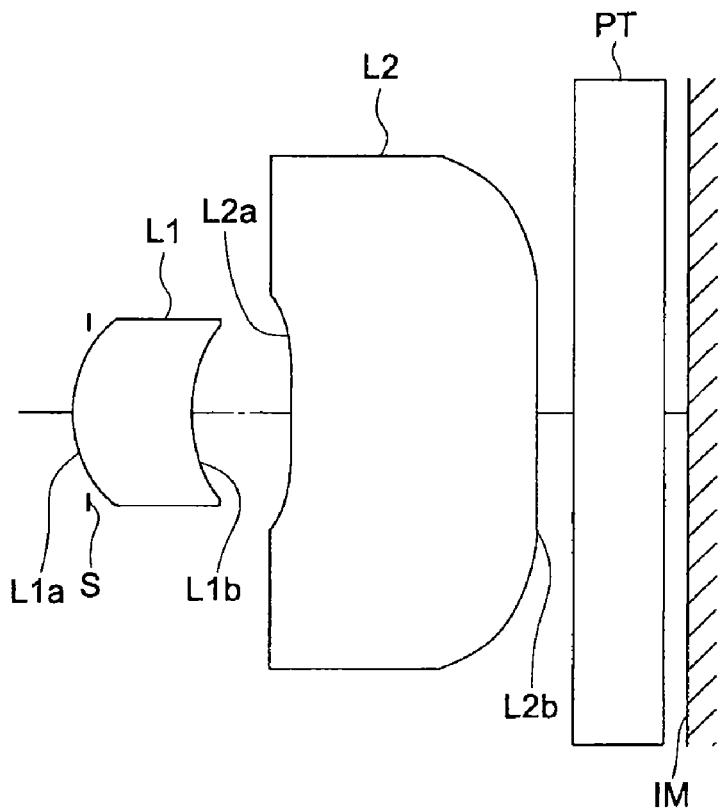
FIG. 17 is a cross sectional view of the image pickup lens shown in Embodiment 4.
Figure 18A:
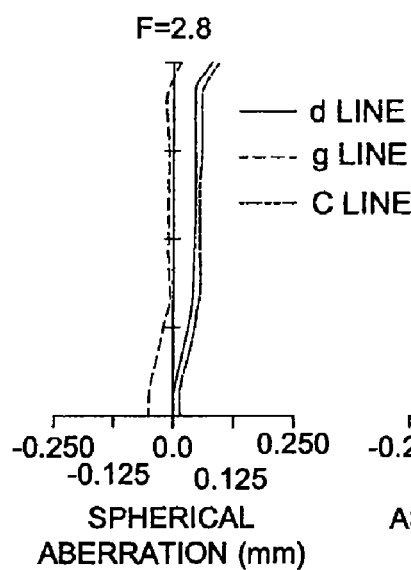
FIGS. 18a, 18b and 18c each is an aberration diagram (spherical aberration, astigmatism, distortion aberration) of the image pickup lens shown in Embodiment 4.
Figure 18B:
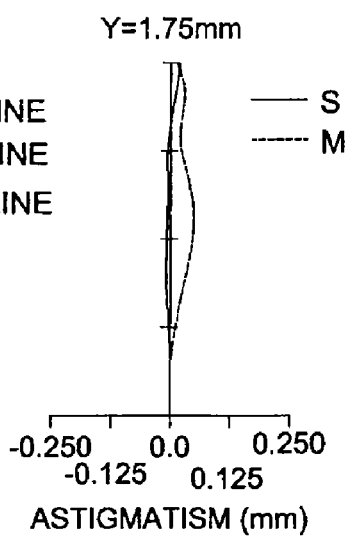
Figure 18C:
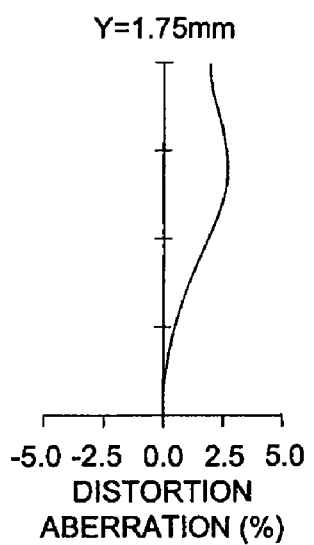
Figure 19:
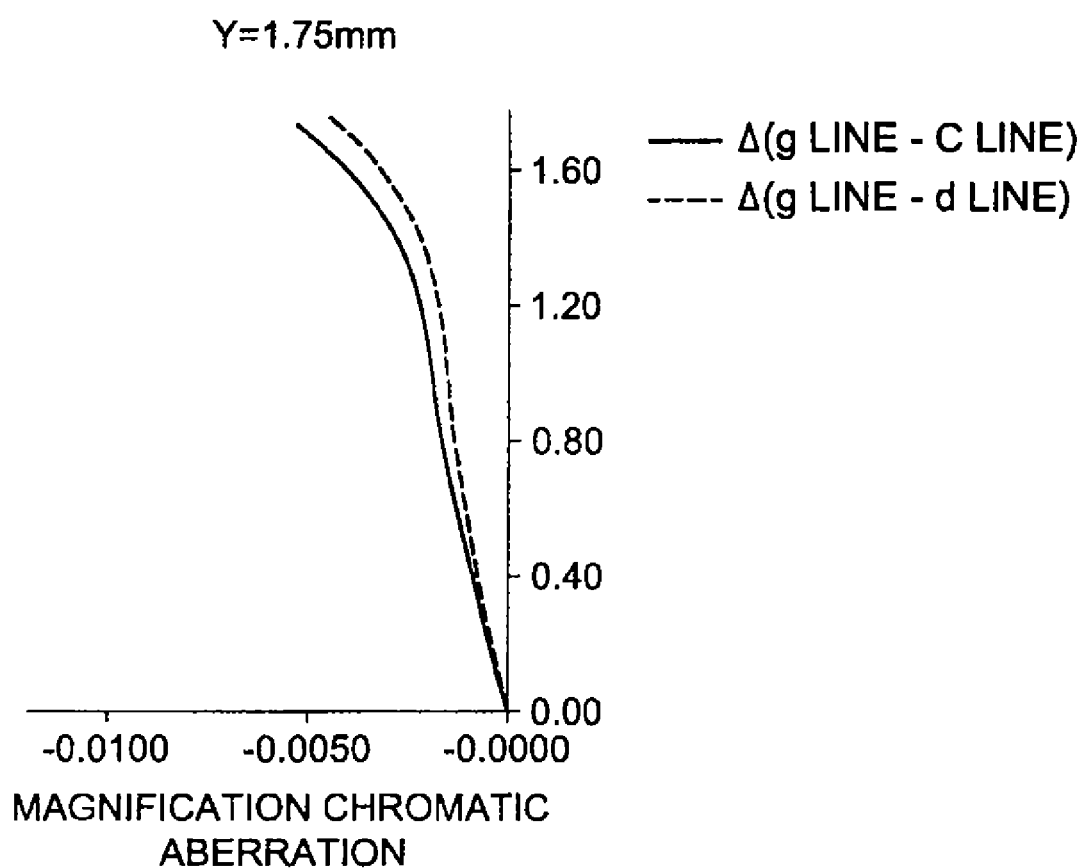
FIG. 19 is a magnification chromatic aberration diagram of the image pickup lens shown in Embodiment 4.

The lens data of Example 4 are shown in Table 4. FIG. 17 is a cross sectional view of the image pickup lens of Example 4. FIG. 18*a* shows aberration diagrams (spherical aberration (FIG. 18*a*), astigmatism (FIG. 18*b*), distortion aberration (FIG. 18*c*)) of Example 4. FIG. 19 is a magnification chromatic aberration diagram of Example 4. The image pickup lens of Example 4 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

TABLE 4

Example 4
CONSTRUCTION DATA
Reference Wave Length = 587.56 nm
unit: mm
Construction data

| NUM. | r | d | nd | vd | Effective radius |
|---|---|---|---|---|---|
| object | infinity | 1000.000 | | | |
| 1 (stop) | infinity | 0.050 | | | 0.994 |
| 2 | infinity | −0.140 | | | 0.994 |
| 3* | 0.894 | 0.634 | 1.61154 | 61.22 | 1.025 |
| 4* | 1.504 | 0.524 | | | 1.000 |
| 5* | −10.958 | 1.354 | 1.61154 | 61.22 | 1.398 |
| 6* | −120.384 | 0.202 | | | 2.840 |
| 7 | infinity | 0.500 | 1.51633 | 64.14 | 3.209 |
| 8 | infinity | 0.111 | | | 3.433 |
| image | infinity | | | | |

Aspherical Coefficients

| | |
|---|---|
| 3 | K = −1.07358e+001, A4 = 1.73273e+000, A6 = −5.80219e+000, A8 = 1.70399e+001, A10 = −2.45096e+001, A12 = 1.06381e+001, A14 = 0.00000e+000, A16 = 0.00000e+000, A18 = 0.00000e+000, A20 = 0.00000e+000 |
| 4 | K = −1.53715e+000, A4 = 4.14571e−001, A6 = −2.07395e−001, A8 = 4.57990e+000, A10 = −7.38620e+000, A12 = 1.72470e+000, A14 = 1.47360e+002, A16 = −3.06202e+002, A18 = 0.00000e+000, A20 = 0.00000e+000 |
| 5 | K = −3.00000e+001, A4 = −2.14136e−001, A6 = −3.87589e−001, A8 = 1.64859e+000, A10 = −3.95328e+000, A12 = 2.66324e+000, A14 = 0.00000e+000, A16 = 0.00000e+000, A18 = 0.00000e+000, A20 = 0.00000e+000 |
| 6 | K = −3.00000e+001, A4 = −2.69672e−002, A6 = −1.45954e−002, A8 = −1.72602e−002, A10 = 1.15055e−002, A12 = −2.74164e−003, A14 = 0.00000e+000, A16 = 0.00000e+000, A18 = 0.00000e+000, A20 = 0.00000e+000 |

| | |
|---|---|
| FL | 2.788 |
| Fno | 2.800 |
| w | 31.184 |
| y max | 1.750 |
| TL | 3.143 |
| BF | 0.631 |

| Elem | Surfs | Focal Length |
|---|---|---|
| 1 | 3-4 | 2.584 |
| 2 | 5-6 | −19.806 |

TABLE 5

Example 5
CONSTRUCTION DATA
Reference Wave Length = 587.56 nm
unit: mm
Construction data

| NUM. | r | d | nd | vd | Effective radius |
|---|---|---|---|---|---|
| object | infinity | 1000.000 | | | |
| 1 (stop) | infinity | 0.050 | | | 0.995 |
| 2 | infinity | −0.146 | | | 0.995 |
| 3* | 0.882 | 0.703 | 1.58313 | 59.44 | 1.016 |
| 4* | 1.566 | 0.455 | | | 1.012 |
| 5* | −7.263 | 1.299 | 1.58313 | 59.44 | 1.327 |
| 6* | −120.000 | 0.217 | | | 2.718 |
| 7 | infinity | 0.500 | 1.51633 | 64.14 | 3.099 |
| 8 | infinity | 0.113 | | | 3.391 |
| image | infinity | | | | |

Aspherical Coefficients

| | |
|---|---|
| 3 | K = −6.63417e+000, A4 = 1.21420e+000, A6 = −3.34087e+000, A8 = 1.09236e+001, A10 = −1.56658e+001, A12 = 1.66957e+000, A14 = 0.00000e+000, A16 = 0.00000e−000, A18 = 0.00000e+000, A20 = 0.00000e+000 |
| 4 | K = −1.42284e+001, A4 = 7.89791e−001, A6 = 1.48954e−001, A8 = −8.48512e+000, A10 = 4.05058e+001, A12 = 3.47512e+001, A14 = −1.10443e+002, A16 = −3.72942e+002, A18 = 0.00000e+000, A20 = 0.00000e+000 |
| 5 | K = 4.67058e+001, A4 = −1.98725e−001, A6 = −6.02812e−001, A8 = 5.27126e−001, A10 = 7.64355e+000, A12 = −3.15682e+001, A14 = 3.45978e+001, A16 = −2.55967e+000, A18 = 0.00000e+000, A20 = 0.00000e+000 |
| 6 | K = −2.00000e+001, A4 = 6.55799e−003, A6 = −1.07522e−001, A8 = 6.09768e−002, A10 = −1.89979e−002, A12 = 1.35559e−003, A14 = 0.00000e+000, A16 = 0.00000e+000, A18 = 0.00000e+000, A20 = 0.00000e+000 |

| | |
|---|---|
| FL | 2.799 |
| Fno | 2.800 |
| w | 31.235 |
| y max | 1.750 |
| TL | 3.116 |
| BF | 0.660 |

| Elem | Surfs | Focal Length |
|---|---|---|
| 1 | 3-4 | 2.511 |
| 2 | 5-6 | −13.314 |

Example 5

Figure 20:
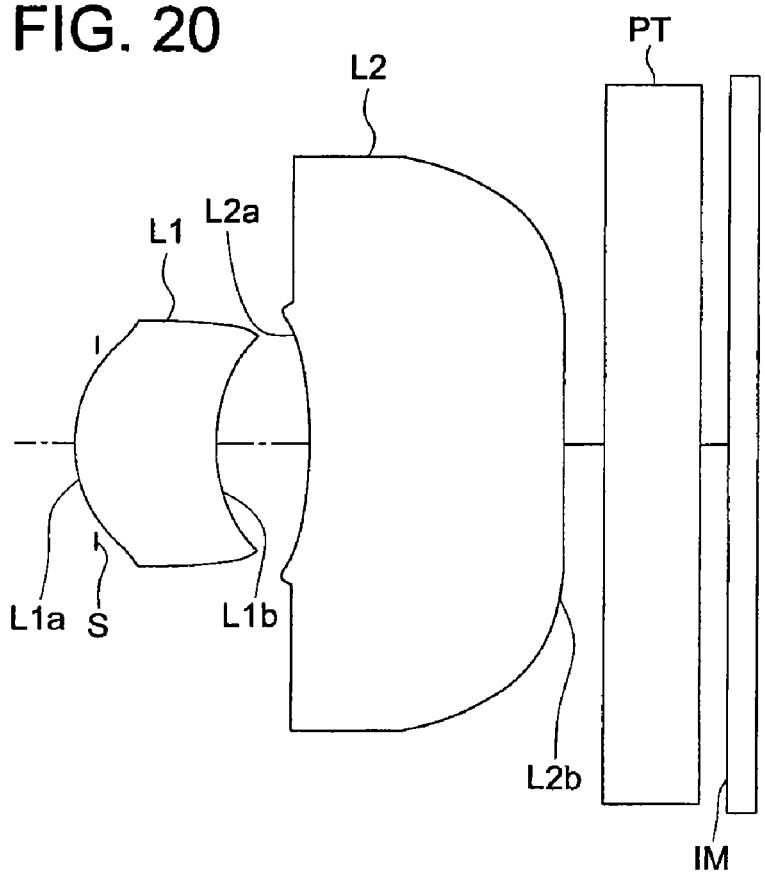
FIG. 20 is a cross sectional view of the image pickup lens shown in Embodiment 5.
Figure 21A:
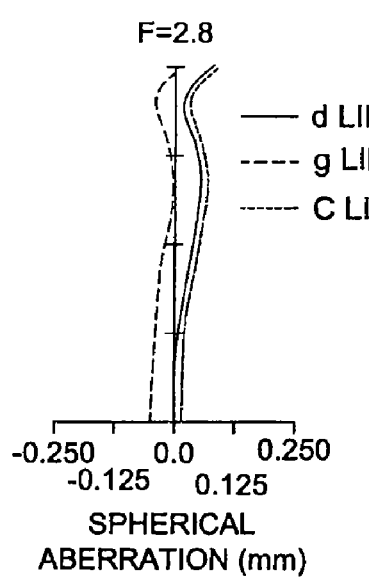
FIGS. 21a, 21b and 21c each is an aberration diagram (spherical aberration, astigmatism, distortion aberration) of the image pickup lens shown in Embodiment 5.
Figure 21B:
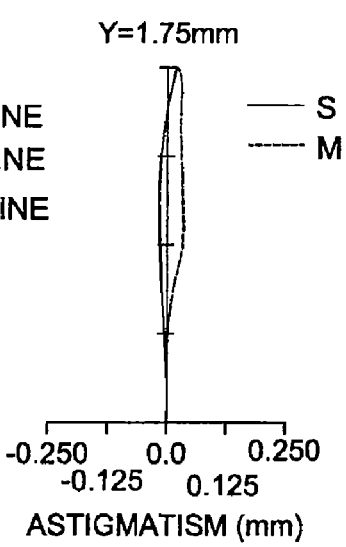
Figure 21C:
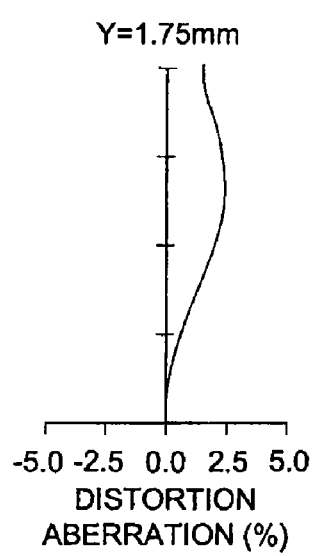
Figure 22:
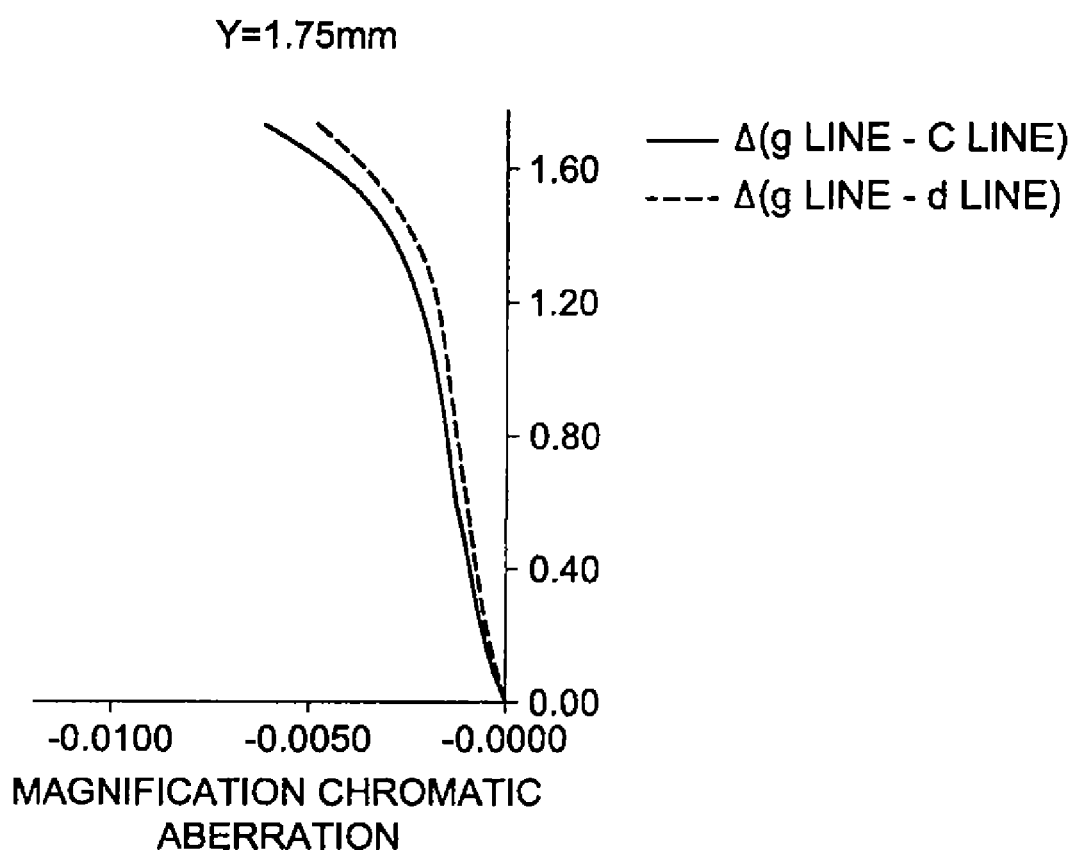
FIG. 22 is a magnification chromatic aberration diagram of the image pickup lens shown in Embodiment 5.

The lens data of Example 5 are shown in Table 5. FIG. 20 is a cross sectional view of the image pickup lens of Example 5. FIG. 21 shows aberration diagrams (spherical aberration (FIG. 21*a*), astigmatism (FIG. 21*b*), distortion aberration (FIG. 21*c*)) of Example 5. FIG. 22 is a magnification chromatic aberration diagram of Example 5. The image pickup lens of Example 5 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

Example 6

Figure 25:
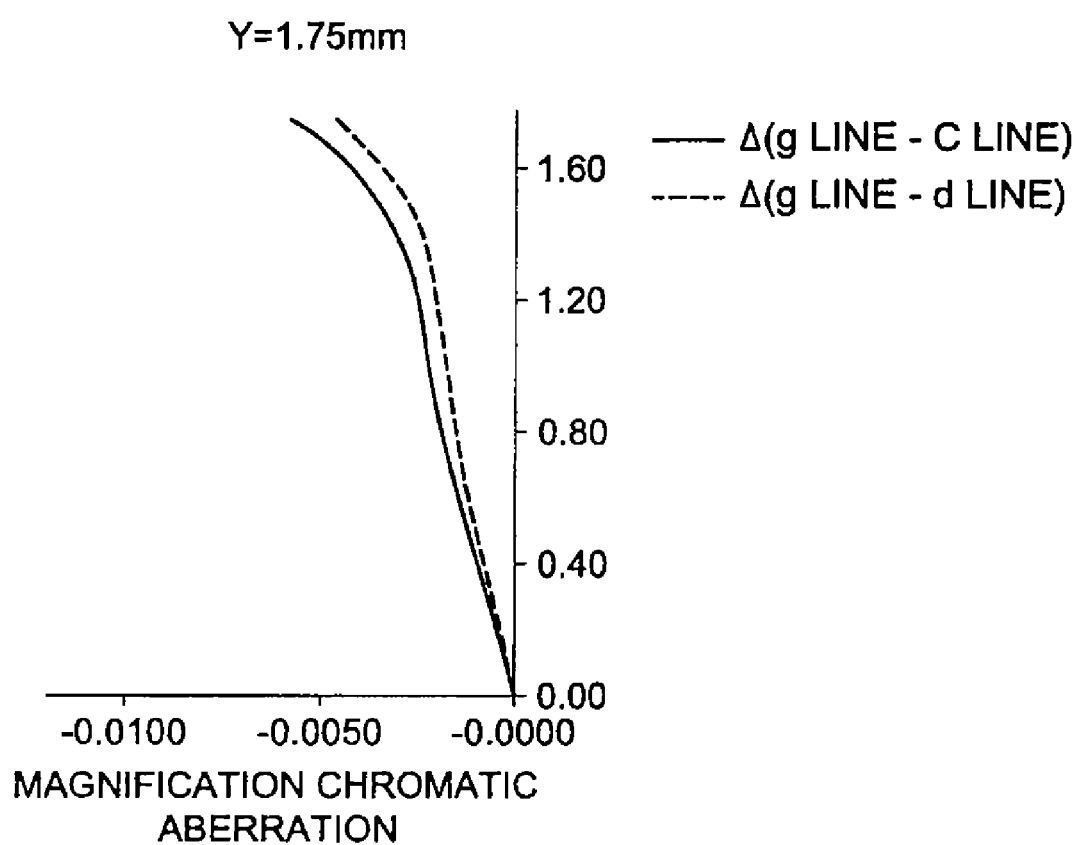
FIG. 25 is a magnification chromatic aberration diagram of the image pickup lens shown in Embodiment 6.

The lens data of Example 5 are shown in Table 6. FIG. 23 is a cross sectional view of the image pickup lens of Example 6. FIG. 24 shows aberration diagrams (spherical aberration (FIG. 24*a*), astigmatism (FIG. 24*b*), distortion aberration (FIG. 24*c*)) of Example 6. FIG. 25 is a magnification chromatic aberration diagram of Example 6. The image pickup lens of Example 6 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

TABLE 6

Example 6
CONSTRUCTION DATA
Reference Wave Length = 587.56 nm
unit: mm
Construction data

| NUM. | r | d | nd | vd | Effective radius |
|---|---|---|---|---|---|
| object | infinity | 1000.000 | | | |
| 1 (stop) | infinity | 0.050 | | | 0.993 |
| 2 | infinity | −0.132 | | | 0.993 |
| 3* | 0.926 | 0.686 | 1.61154 | 61.22 | 1.022 |
| 4* | 1.659 | 0.473 | | | 1.022 |
| 5* | −8.319 | 1.404 | 1.61154 | 61.22 | 1.323 |
| 6* | −120.384 | 0.168 | | | 2.842 |
| 7 | infinity | 0.500 | 1.51633 | 64.14 | 3.201 |
| 8 | infinity | 0.133 | | | 3.436 |
| image | Infinity | | | | |

Aspherical Coefficients

| 3 | K = −1.07582e+001, A4 = 1.60088e+000, A6 = −5.65354e+000, A8 = 1.88617e+001, A10 = −3.59940e+001, A12 = 2.94989e+001, A14 = 0.00000e+000, A16 = 0.00000e+000, A18 = 0.00000e+000, A20 = 0.00000e+000 |
|---|---|
| 4 | K = −6.37592e+000, A4 = 4.12421e−001, A6 = 2.55112e−002, A8 = 3.99693e+000, A10 = −1.53317e+001, A12 = 1.61467e+001, A14 = 1.54753e+002, A16 = −3.06039e+002, A18 = 0.00000e+000, A20 = 0.00000e+000 |
| 5 | K = −3.78181e+000, A4 = −2.51482e−001, A6 = −1.72147e−001, A8 = −2.55663e−003, A10 = 3.88575e−001, A12 = −2.64810e+000, A14 = 0.00000e+000, A16 = 0.00000e+000, A18 = 0.00000e+000, A20 = 0.00000e+000 |
| 6 | K = 3.00000e+001, A4 = −2.38848e−002, A6 = −1.43288e−002, A8 = −1.67873e−002, A10 = 1.08548e−002, A12 = −2.60037e−003, A14 = 0.00000e+000, A16 = 0.00000e+000, A18 = 0.00000e+000, A20 = 0.00000e+000 |

| FL | 2.802 |
|---|---|
| Fno | 2.800 |
| w | 31.184 |
| y max | 1.750 |
| TL | 3.208 |
| BF | 0.645 |

| Elem | Surfs | Focal Length |
|---|---|---|
| 1 | 3-4 | 2.532 |
| 2 | 5-6 | −14.682 |

TABLE 7

Example 7
CONSTRUCTION DATA
Reference Wave Length = 587.56 nm
unit: mm
Construction data

| NUM. | r | d | nd | vd | Effective radius |
|---|---|---|---|---|---|
| object | infinity | 1000.000 | | | |
| 1 (stop) | infinity | 0.050 | | | 0.974 |
| 2 | infinity | −0.157 | | | 1.004 |
| 3* | 0.871 | 0.642 | 1.59340 | 68.30 | 1.016 |
| 4* | 1.486 | 0.500 | | | 0.991 |
| 5* | −7.182 | 1.380 | 1.48563 | 85.20 | 1.380 |
| 6* | −819.169 | 0.105 | | | 2.854 |
| 7 | infinity | 0.500 | 1.51633 | 64.14 | 3.210 |
| 8 | infinity | 0.132 | | | 3.460 |
| image | infinity | | | | |

Aspherical Coefficients

| 3 | K = −1.27903e+001, A4 = 2.22711e+000, A6 = −9.96820e+000, A8 = 3.80417e+001, A10 = −7.85940e+001, A12 = 6.58484e+001, A14 = 0.00000e+000, A16 = 0.00000e+000, A18 = 0.00000e+000, A20 = 0.00000e+000 |
|---|---|
| 4 | K = 8.04455e−002, A4 = 3.64622e−001, A6 = 5.83086e−001, A8 = −2.62249e+000, A10 = 1.93120e+001, A12 = −6.84638e+000, A14 = 1.19478e+002, A16 = −4.39297e+002, A18 = 0.00000e+000, A20 = 0.00000e+000 |
| 5 | K = 2.42137e+001, A4 = 4.25517e−002, A6 = −2.91434e+000, A8 = 1.22332e+001, A10 = −2.61567e+001, A12 = 2.11307e+001, A14 = 0.00000e+000, A16 = 0.00000e+000, A18 = 0.00000e+000, A20 = 0.00000e+000 |
| 6 | K = 2.99854e+001, A4 = 5.49477e−002, A6 = −1.22132e−001, A8 = 4.06820e−002, A10 = −7.94016e−003, A12 = 2.66236e−004, A14 = 0.00000e+000, A16 = 0.00000e+000, A18 = 0.00000e+000, A20 = 0.00000e+000 |

| FL | 2.809 |
|---|---|
| Fno | 2.880 |
| w | 31.274 |
| y max | 1.750 |
| TL | 3.104 |
| BF | 0.582 |

| Elem | Surfs | Focal Length |
|---|---|---|
| 1 | 3-4 | 2.553 |
| 2 | 5-6 | −14.928 |

Example 7

Figure 26:
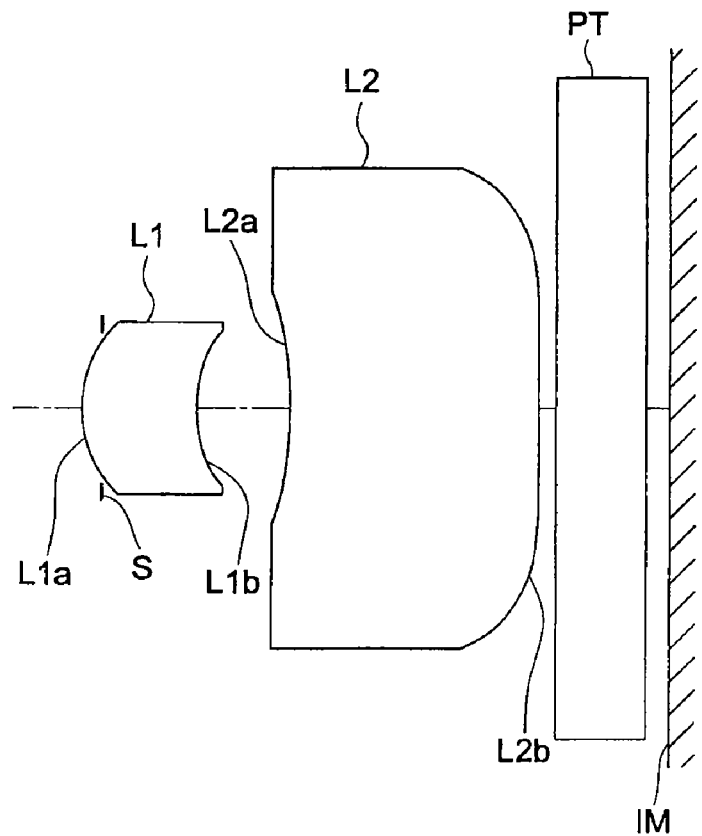
FIG. 26 is a cross sectional view of the image pickup lens shown in Embodiment 7.
Figure 27A:
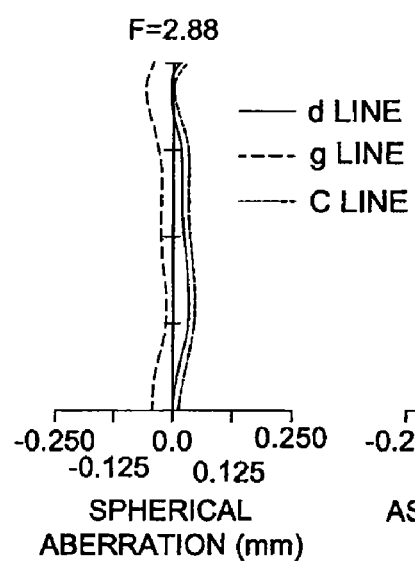
FIGS. 27a, 27b and 27c each is an aberration diagram (spherical aberration, astigmatism, distortion aberration) of the image pickup lens shown in Embodiment 7.
Figure 27B:
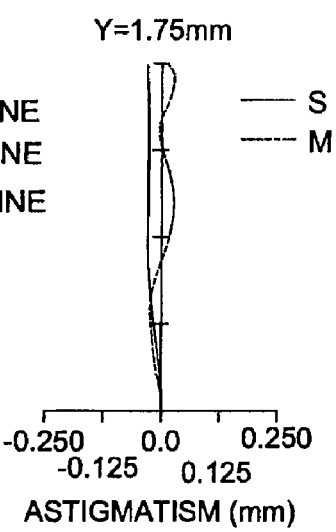
Figure 27C:
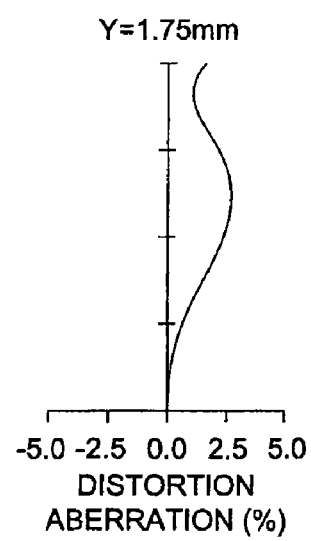
Figure 28:
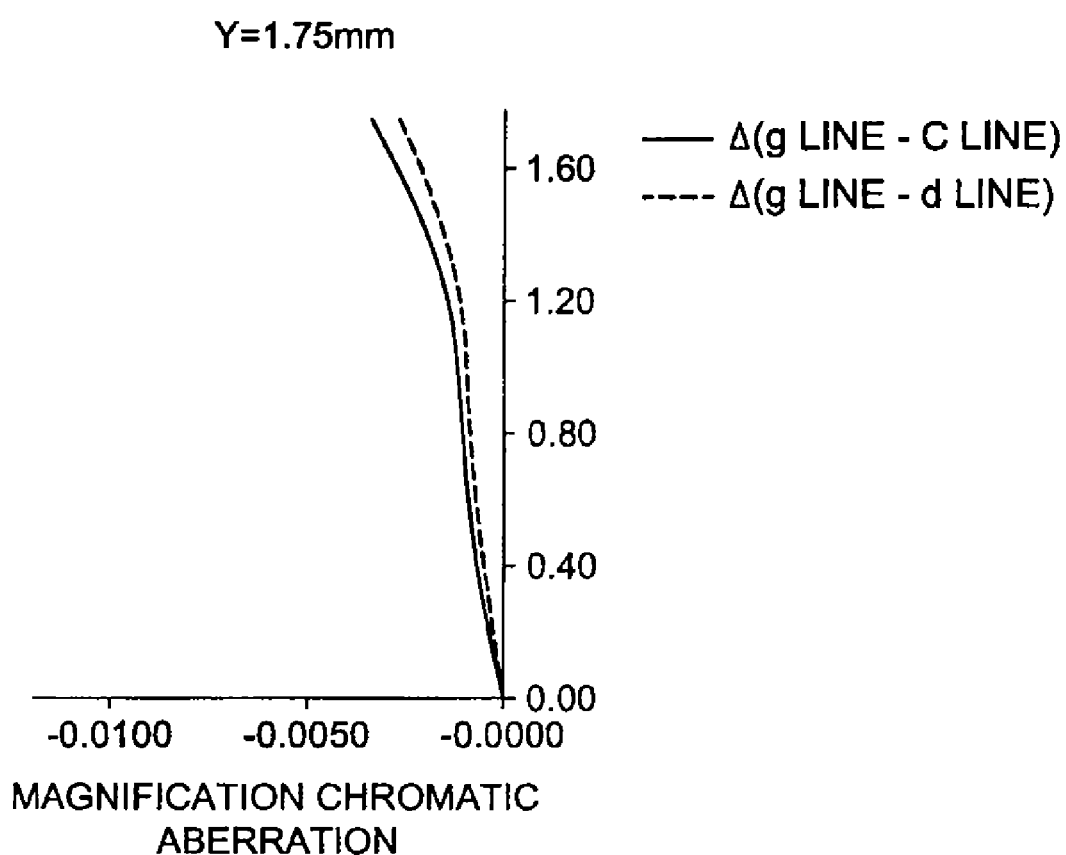
FIG. 28 is a magnification chromatic aberration diagram of the image pickup lens shown in Embodiment 7.

The lens data of Example 7 are shown in Table 7. FIG. 26 is a cross sectional view of the image pickup lens of Example 7. FIG. 27 shows aberration diagrams (spherical aberration (FIG. 27a), astigmatism (FIG. 27b), distortion aberration (FIG. 27c)) of Example 7. FIG. 28 is a magnification chromatic aberration diagram of Example 7. The image pickup lens of Example 7 comprises, in the order from the object side, an aperture stop S, a positive meniscus lens L1 having a convex optical surface L1a at the object side and a concave optical surface L1b at the image side, a negative meniscus lens L2 having a concave optical surface L2a at the object side and a convex optical surface L2b at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

Example 8

Figure 29:
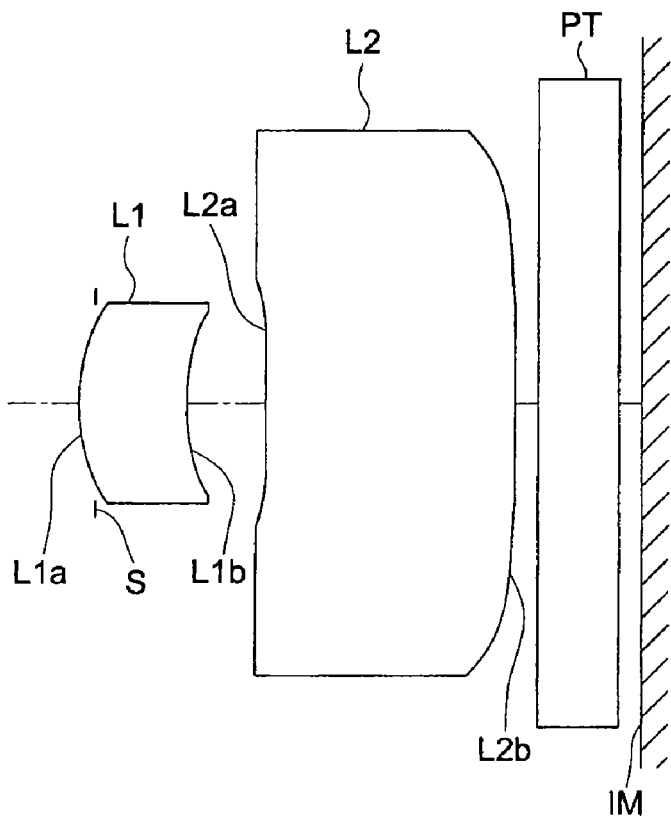
FIG. 29 is a cross sectional view of the image pickup lens shown in Embodiment 8.
Figures 30A, 30B, 30C:
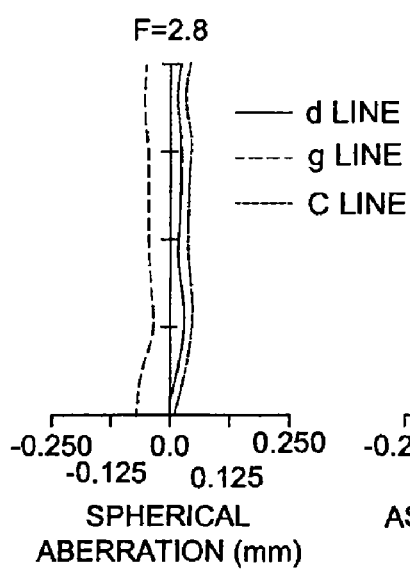
FIGS. 30a, 30b and 30c each is an aberration diagram (spherical aberration, astigmatism, distortion aberration) of the image pickup lens shown in Embodiment 8.
Figure 31:
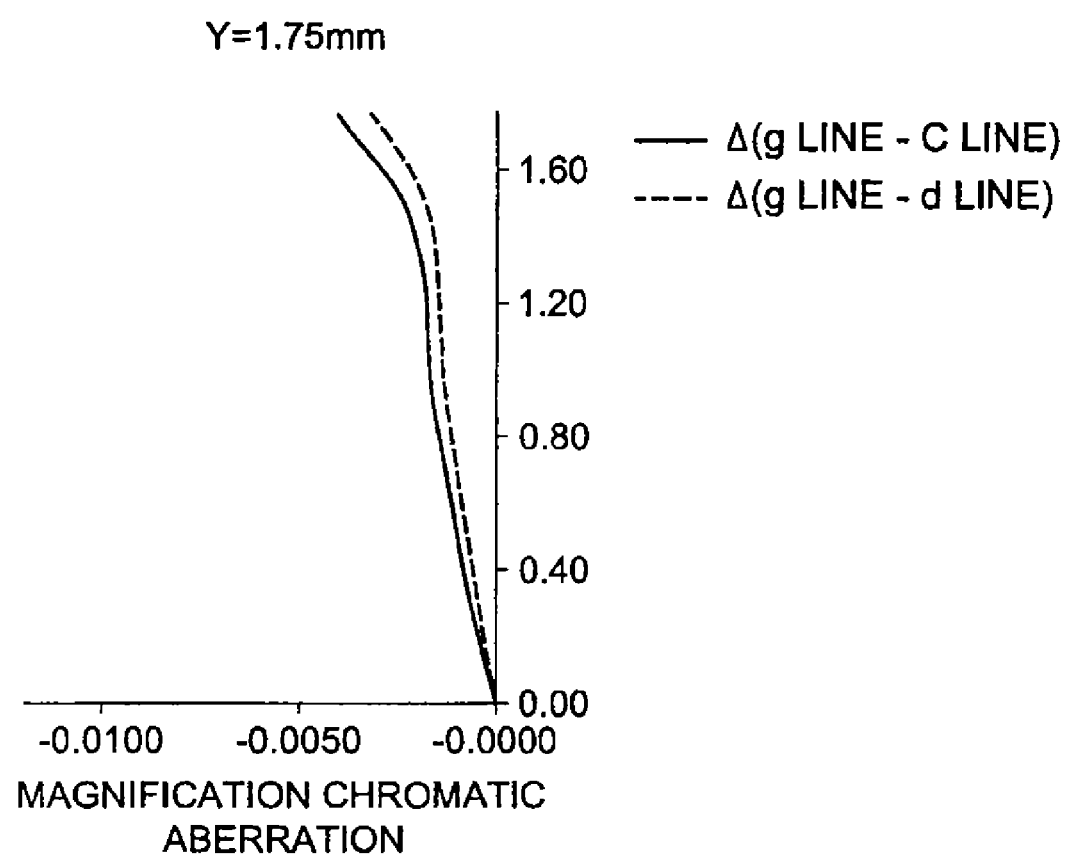
FIG. 31 is a magnification chromatic aberration diagram of the image pickup lens shown in Embodiment 8.

The lens data of Example 8 are shown in Table 8. FIG. 29 is a cross sectional view of the image pickup lens of Example 8. FIG. 30 shows aberration diagrams (spherical aberration (FIG. 30a), astigmatism (FIG. 30b), distortion aberration FIG. 30c)) of Example 8. FIG. 31 is a magnification chromatic aberration diagram of Example 8. The image pickup lens of Example 8 comprises, in the order from the object side, an aperture stop S, a positive meniscus lens L1 having a convex optical surface L1a at the object side and a concave optical surface L1b at the image side, a negative meniscus lens L2 having a concave optical surface L2a at the object side and a convex optical surface L2b at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

TABLE 8

Example 8
CONSTRUCTION DATA
Reference Wave Length = 587.56 nm
unit: mm
Construction data

| NUM. | r | d | nd | vd | Effective radius |
|---|---|---|---|---|---|
| object | infinity | 1000.000 | | | |
| 1 (stop) | infinity | 0.050 | | | 0.997 |
| 2 | infinity | −0.156 | | | 0.997 |
| 3* | 0.973 | 0.639 | 1.77200 | 50.00 | 0.997 |
| 4* | 1.298 | 0.460 | | | 0.945 |
| 5* | −18.960 | 1.496 | 1.59340 | 68.30 | 1.387 |
| 6* | −22.991 | 0.142 | | | 2.906 |
| 7 | infinity | 0.500 | 1.51633 | 64.14 | 3.234 |
| 8 | infinity | 0.134 | | | 3.457 |
| image | infinity | | | | |

Aspherical Coefficients

| | |
|---|---|
| 3 | K = −1.58329e+001, A4 = 2.00148e+000, A6 = −9.41507e+000, A8 = 3.73455e+001, A10 = −8.33571e+001, A12 = 7.83385e+001, A14 = 0.00000e+000, A16 = 0.00000e+000, A18 = 0.00000e+000, A20 = 0.00000e+000 |
| 4 | K = −9.40900e−001, A4 = 3.23257e−001, A6 = 3.30128e−001, A8 = 3.30171e+000, A10 = −1.39358e+001, A12 = 2.39121e+001, A14 = 1.47168e+002, A16 = −3.06189e+002, A18 = 0.00000e+000, A20 = 0.00000e+000 |
| 5 | K = −2.56874e+001, A4 = −1.27668e−001, A6 = −7.15978e−001, A8 = 3.29922e+000, A10 = −8.48110e+000, A12 = 7.63709e+000, A14 = 0.00000e+000, A16 = 0.00000e+000, A18 = 0.00000e+000, A20 = 0.00000e+000 |
| 6 | K = −1.30857e+001, A4 = −1.10238e−002, A6 = −1.63360e−002, A8 = −1.23515e−003, A10 = −3.53970e−003, A12 = 1.06341e−003, A14 = 0.00000e+000, A16 = 0.00000e+000, A18 = 0.00000e+000, A20 = 0.00000e+000 |

| | | |
|---|---|---|
| FL | | 2.798 |
| Fno | | 2.800 |
| w | | 31.327 |
| y max | | 1.750 |
| TL | | 3.226 |
| BF | | 0.632 |

| Elem | Surfs | Focal Length |
|---|---|---|
| 1 | 3-4 | 2.710 |
| 2 | 5-6 | −211.433 |

TABLE 9

Example 9
CONSTRUCTION DATA
Reference Wave Length = 587.56 nm
unit: mm
Construction data

| NUM. | r | d | nd | vd | Effective radius |
|---|---|---|---|---|---|
| object | infinity | infinity | | | |
| 1 (stop) | infinity | 0.050 | | | 0.969 |
| 2 | infinity | −0.152 | | | 0.970 |
| 3* | 0.831 | 0.655 | 1.56907 | 71.30 | 0.984 |
| 4* | 1.649 | 0.451 | | | 0.969 |
| 5* | −4.282 | 1.300 | 1.73080 | 40.50 | 1.224 |
| 6* | −22.684 | 0.270 | | | 2.722 |
| 7 | infinity | 0.500 | 1.51633 | 64.14 | 3.183 |
| 8 | infinity | 0.107 | | | 3.421 |
| Image | infinity | | | | |

Aspherical Coefficients

| | |
|---|---|
| 3 | K = −8.46323e+000, A4 = 1.75375e+000, A6 = −5.77888e+000, A8 = 1.91088e+001, A10 = −3.51150e+001, A12 = 2.84005e+001, A14 = 0.00000e+000, A16 = 0.00000e+000, A18 = 0.00000e+000, A20 = 0.00000e+000 |
| 4 | K = −2.38385e+000, A4 = 4.04772e−001, A6 = −4.65692e−001, A8 = 1.03352e+001, A10 = −3.93884e+001, A12 = 7.95965e+001, A14 = 1.53489e+002, A16 = −3.21233e+002, A18 = 0.00000e+000, A20 = 0.00000e+000 |
| 5 | K = 2.51547e+000, A4 = −3.99652e−001, A6 = 9.00698e−001, A8 = −6.95404e+000, A10 = 1.85273e+001, A12 = −2.42563e+001, A14 = 0.00000e+000, A16 = 0.00000e+000, A18 = 0.00000e+000, A20 = 0.00000e+000 |
| 6 | K = 3.00000e+001, A4 = −5.60431e−002, A6 = 1.18903e−002, A8 = −4.65382e−002, A10 = 2.92407e−002, A12 = −7.10419e−003, A14 = 0.00000e+000, A16 = 0.00000e+000, A18 = 0.00000e+000, A20 = 0.00000e+000 |

| | | |
|---|---|---|
| Fl | | 2.790 |
| Fno. | | 2.880 |
| w | | 31.612 |
| y max | | 1.750 |
| TL | | 3.113 |
| BF | | 0.706 |

| Elem | Surfs | Focal Length |
|---|---|---|
| 1 | 3-4 | 2.281 |
| 2 | 5-6 | −7.444 |

Example 9

Figure 32:
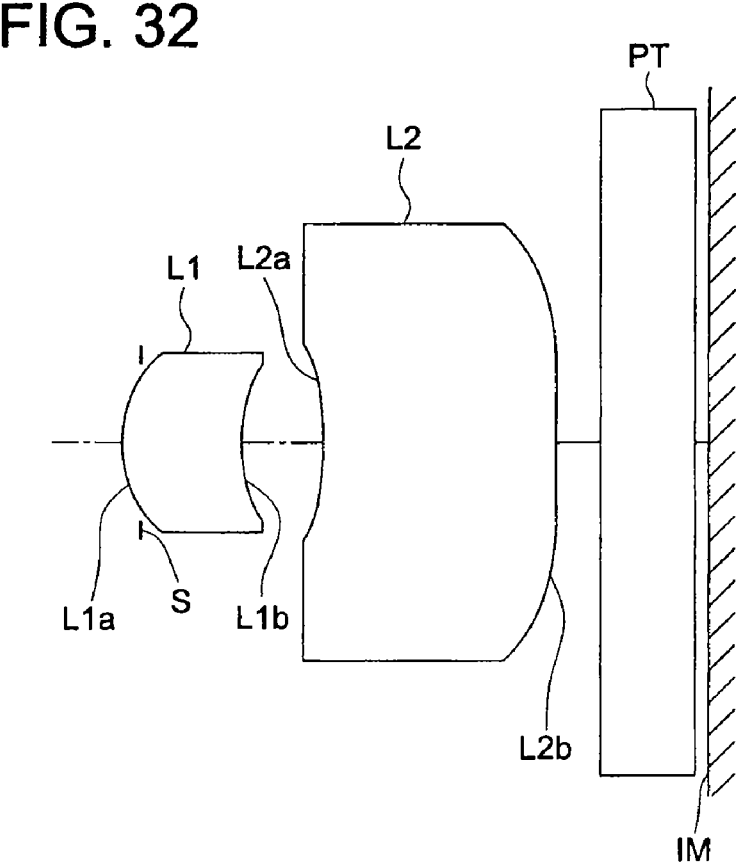
FIG. 32 is a cross sectional view of the image pickup lens shown in Embodiment 9.
Figure 33A:
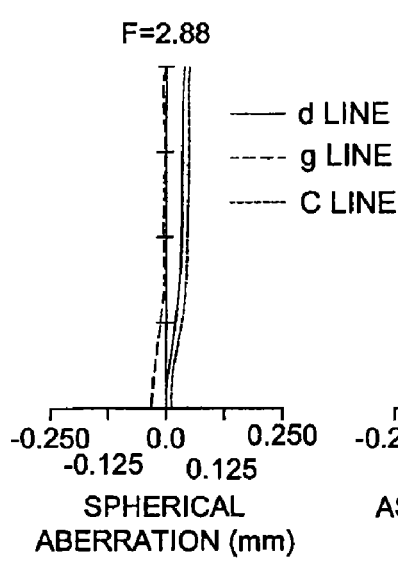
FIGS. 33a, 33b and 33c each is an aberration diagram (spherical aberration, astigmatism, distortion aberration) of the image pickup lens shown in Embodiment 9.
Figure 33B:
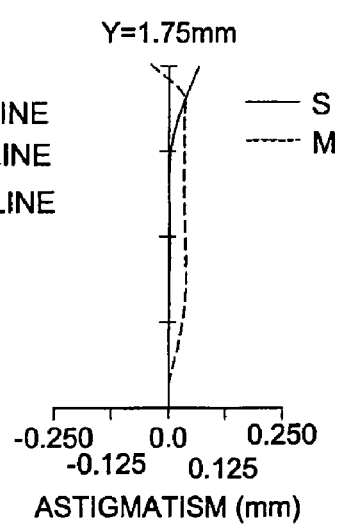
Figure 33C:
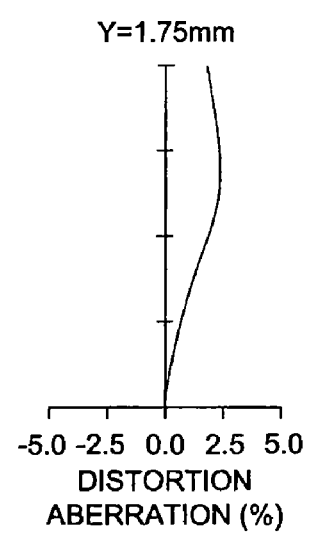
Figure 34:
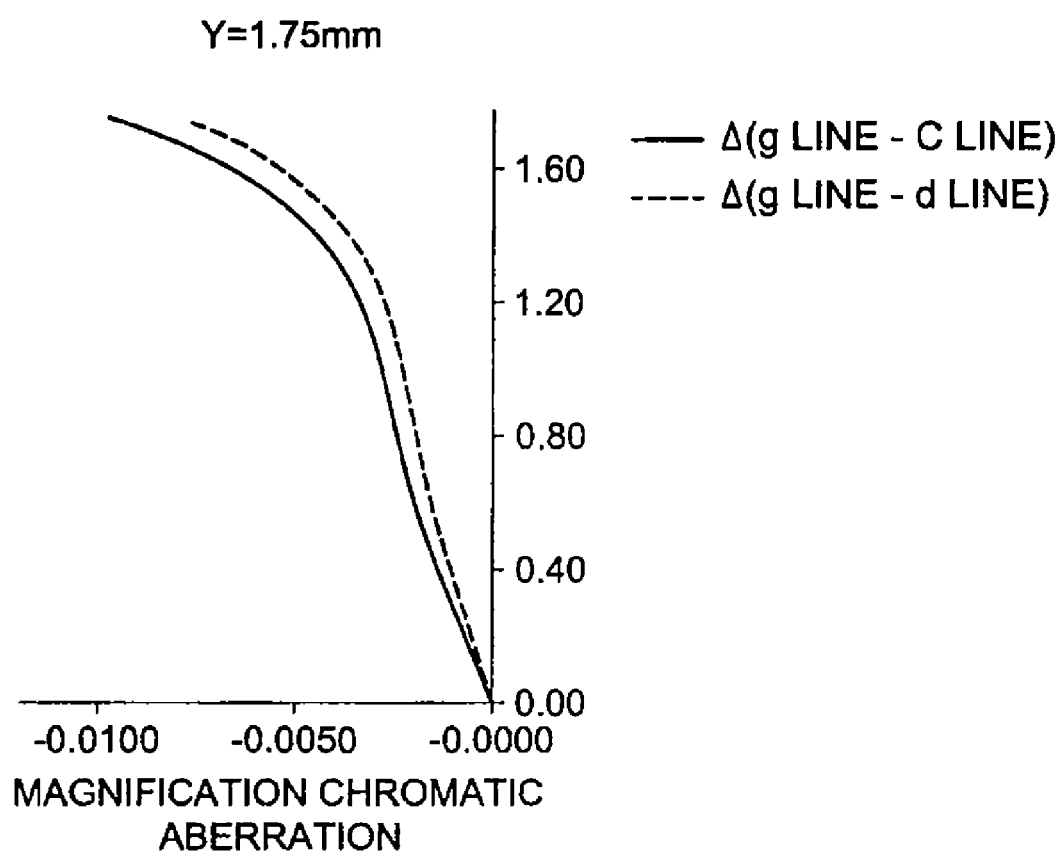
FIG. 34 is a magnification chromatic aberration diagram of the image pickup lens shown in Embodiment 9.

The lens data of Example 9 are shown in Table 9. FIG. 32 is a cross sectional view of the image pickup lens of Example 9. FIG. 33 shows aberration diagrams (spherical aberration (FIG. 33*a*), astigmatism (FIG. 33*b*), distortion aberration (FIG. 33*c*)) of Example 9. FIG. 34 is a magnification chromatic aberration diagram of Example 9. The image pickup lens of Example 9 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

Example 10

Figure 37:
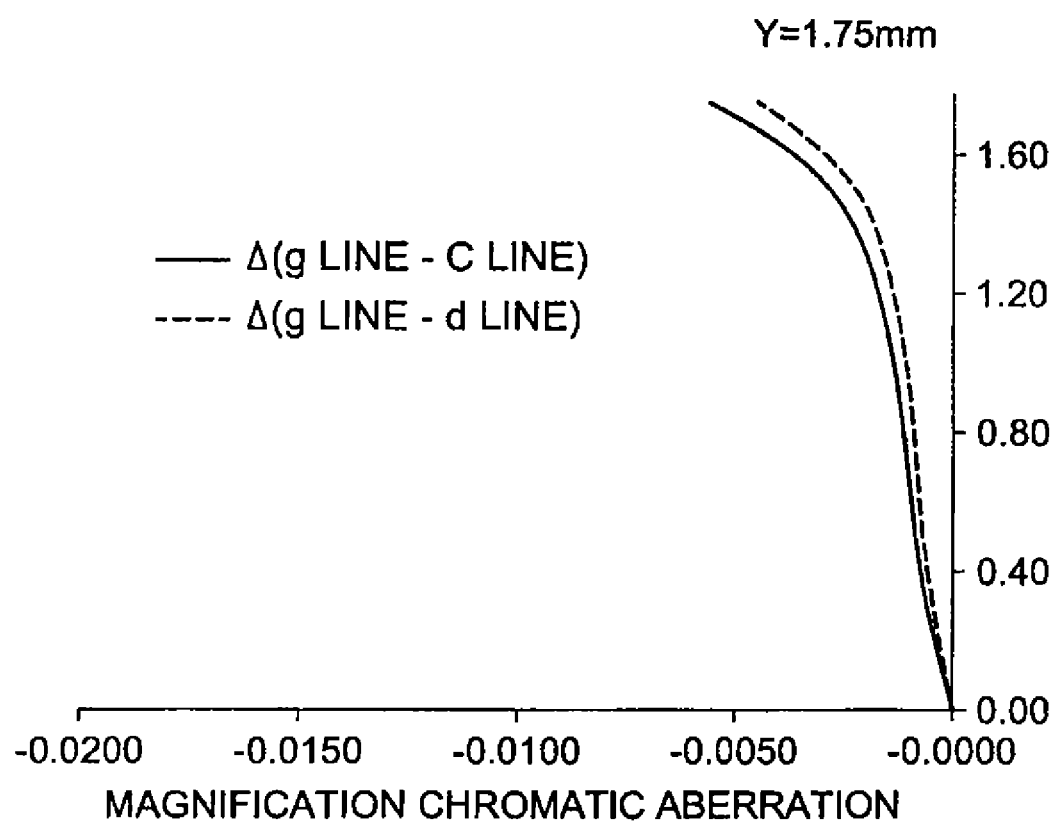
FIG. 37 is a magnification chromatic aberration diagram of the image pickup lens shown in Embodiment 10.

The lens data of Example 10 are shown in Table 10. FIG. 35 is a cross sectional view of the image pickup lens of Example 10. FIG. 36 shows aberration diagrams (spherical aberration (FIG. 36*a*), astigmatism (FIG. 36*b*), distortion aberration (FIG. 36*c*)) of Example 10. FIG. 37 is a magnification chromatic aberration diagram of Example 10. The image pickup lens of Example 10 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut of filter, and a parallel plate PT supposing as a seal glass of a solid state image pickup element. IM is an image pickup plane of the image pickup element. All surfaces of a lens section coming in contact with air are made in an aspheric configuration.

TABLE 10

Example 10
CONSTRUCTION DATA
Reference Wave Length = 587.56 nm
SURF data

| NUM. | r | d | nd | vd | Effective radius |
|---|---|---|---|---|---|
| OBJ | INFINITY | 1000.0000 | | | |
| STO | INFINITY | 0.0500 | | | 1.025 |
| 2 | INFINITY | −0.1320 | | | 1.025 |
| 3* | 0.9122 | 0.7120 | 1.58313 | 59.44 | 1.081 |
| 4* | 1.6230 | 0.5340 | | | 1.056 |
| 5* | −6.4920 | 1.0630 | 1.58313 | 59.44 | 1.353 |
| 6* | INFINITY | 0.2260 | | | 2.594 |
| 7 | INFINITY | 0.2100 | 1.51633 | 64.14 | 3.040 |
| 8 | INFINITY | 0.1000 | | | 3.139 |
| 9 | INFINITY | 0.5000 | 1.47140 | 65.19 | 3.213 |
| 10 | INFINITY | 0.0050 | | | 3.499 |
| IMG | INFINITY | | | | |

ASPHERICAL SURFACE

| 3 | K = −8.13300e+000, A4 = 1.33990e+000, A6 = −4.27020e+000, A8 = 1.49810e+001, A10 = −2.48630e+001, A12 = −4.28610e+001, A14 = 2.89710e+002, A16 = −4.10250e+002, A18 = 0.00000e+000, A20 = 0.00000e+000 |
| --- | --- |
| 4 | K = −7.69810e+000, A4 = 1.12730e−001, A6 = 5.33160e+000, A8 = −8.10610e+001, A10 = 7.18660e+002, A12 = −3.42880e+003, A14 = 8.48410e+003, A16 = −8.44840e+003, A18 = 0.00000e+000, A20 = 0.00000e+000 |
| 5 | K = 3.25540e+001, A4 = −2.47430e−001, A6 = 5.03910e−001, A8 = −2.71550e+001, A10 = 2.94940e+002, A12 = −1.58570e+003, A14 = 4.72670e+003, A16 = −7.89680e+003, A18 = 6.77240e+003, A20 = −2.24550e+003 |
| 6 | K = 5.00000e+001, A4 = −4.80700e−002, A6 = −1.14920e−001, A8 = 1.27800e−001, A10 = −6.69230e−002, A12 = −8.12020e−003, A14 = 1.19840e−002, A16 = 4.33990e−003, A18 = −4.52240e−003, A20 = 6.78110e−004 |

| | |
|---|---|
| FL | 2.962 |
| Fno | 2.880 |
| w | 30.575 |
| y max | 1.750 |
| TL | 3.117 |
| BF | 0.808 |

| Elem | Surfs | Focal Length |
|---|---|---|
| 1 | 3-4 | 2.609 |
| 2 | 5-6 | −11.133 |

TABLE 11

Example 11
CONSTRUCTION DATA
Reference Wave Length = 587.56 nm
SURF data

| NUM. | r | d | nd | vd | Effective radius |
|---|---|---|---|---|---|
| OBJ | INFINITY | 1000.0000 | | | |
| STO | INFINITY | 0.0500 | | | 1.045 |
| 2 | INFINITY | −0.1350 | | | 1.045 |
| 3* | 0.9322 | 0.7290 | 1.58313 | 59.44 | 1.102 |
| 4* | 1.7093 | 0.5400 | | | 1.065 |
| 5* | −5.7220 | 1.1300 | 1.58313 | 59.44 | 1.326 |
| 6* | INFINITY | 0.1000 | | | 2.569 |
| 7 | INFINITY | 0.2100 | 1.51633 | 64.14 | 2.877 |
| 8 | INFINITY | 0.1920 | | | 2.993 |
| 9 | INFINITY | 0.5000 | 1.47140 | 65.19 | 3.183 |
| 10 | INFINITY | 0.0050 | | | 3.499 |
| IMG | INFINITY | | | | |

ASPHERICAL SURFACE

| 3 | K = −7.45650e+000, A4 = 1.24530e+000, A6 = −4.47630e+000, A8 = 1.87210e+001, A10 = −3.45370e+001, A12 = −6.49730e+001, A14 = 3.98280e+002, A16 = −4.89770e+002, A18 = 0.00000e+000, A20 = 0.00000e+000 |
| --- | --- |
| 4 | K = 2.01500e−001, A4 = 2.60700e−001, A6 = −1.07270e+000, A8 = 1.59850e+001, A10 = −5.86880e+001, A12 = −4.66610e+001, A14 = 8.75180e+002, A16 = −1.51670e+003, A18 = 0.00000e+000, A20 = 0.00000e+000 |
| 5 | K = 3.46140e+000, A4 = −3.57770e−001, A6 = 1.95230e+000, A8 = −3.22170e+001, A10 = 2.14130e+002, A12 = −6.33070e+002, A14 = 2.91450e+002, A16 = 2.79900a+003, A18 = −6.41100e+003, A20 = 4.31300e+003 |
| 6 | K = 5.00000e+001, A4 = −6.91180e−002, A6 = −7.42140e−002, A8 = 7.68440e−002, A10 = −3.75930e−002, A12 = −9.57820e−003, A14 = 1.03350e−002, A16 = 2.23510e−003, A18 = −3.12990e−003, A20 = 4.98010e−004 |

| | |
|---|---|
| FL | 3.020 |
| Fno | 2.880 |
| w | 30.205 |
| y max | 1.750 |
| TL | 3.173 |
| BF | 0.775 |

| Elem | Surfs | Focal Length |
|---|---|---|
| 1 | 3-4 | 2.613 |
| 2 | 5-6 | −9.813 |

Example 11

Figure 38:
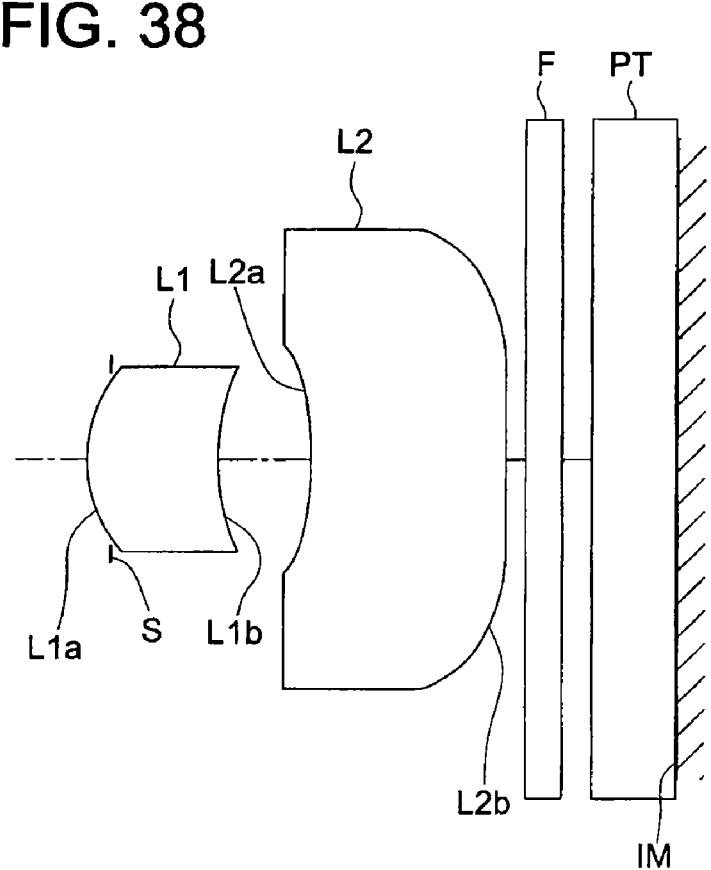
FIG. 38 is a cross sectional view of the image pickup lens shown in Embodiment 11.
Figure 39A:
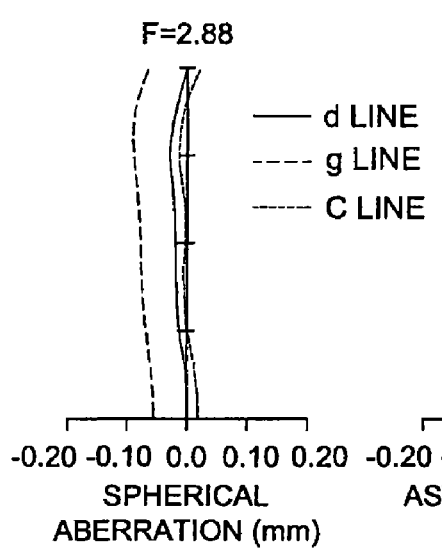
FIGS. 39a, 39b and 39c is an aberration diagram (spherical aberration, astigmatism, distortion aberration) of the image pickup lens shown in Embodiment 11.
Figure 39B:
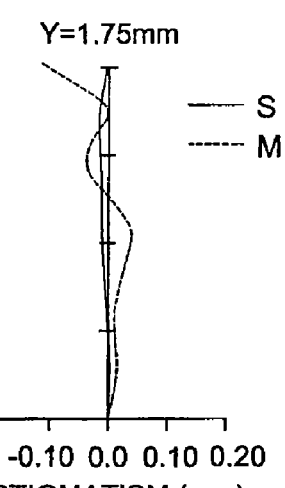
Figure 39C:
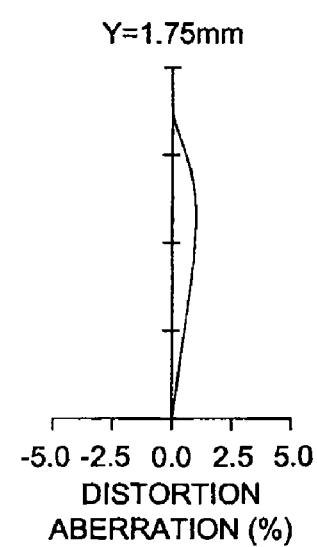
Figure 40:
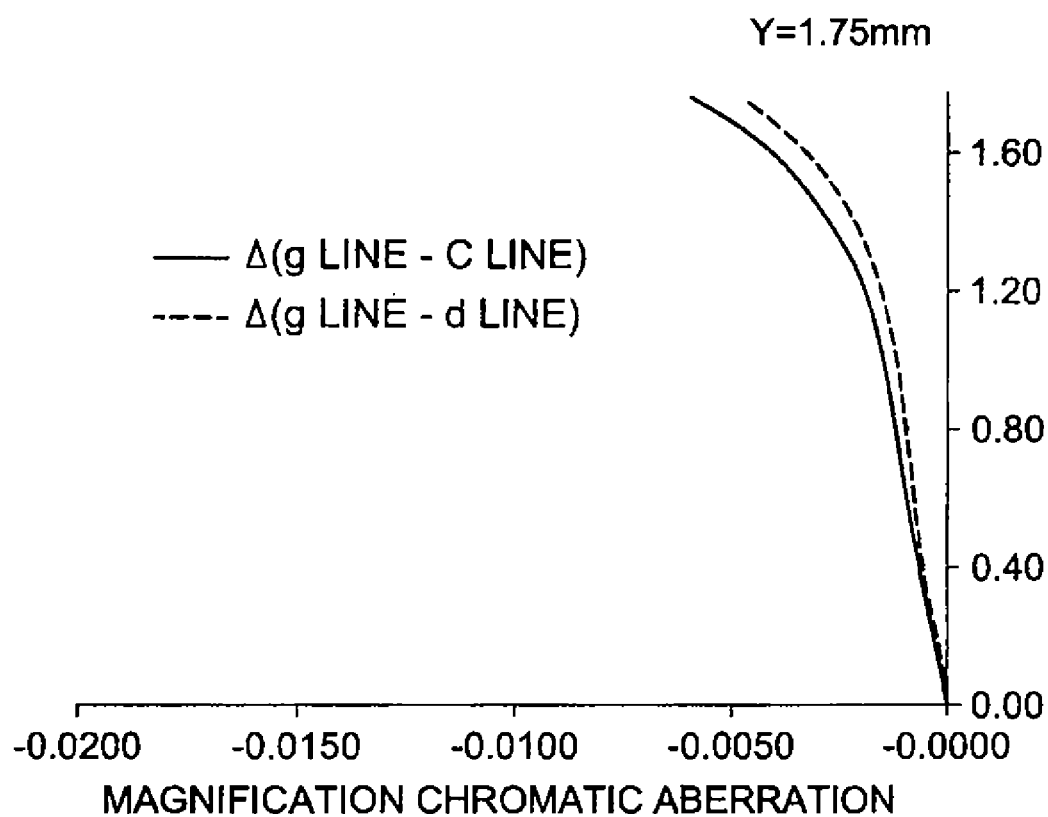
FIG. 40 is a magnification chromatic aberration diagram of the image pickup lens shown in Embodiment 11.

The lens data of Example 11 are shown in Table 11. FIG. 38 is a cross sectional view of the image pickup lens of Example 11. FIG. 39 shows aberration diagrams (spherical aberration (FIG. 39*a*), astigmatism (FIG. 39*b*), distortion aberration (FIG. 39*c*)) of Example 11. FIG. 40 is a magnification chromatic aberration diagram of Example 11. The image pickup lens of Example 11 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

Example 12

Figure 41:
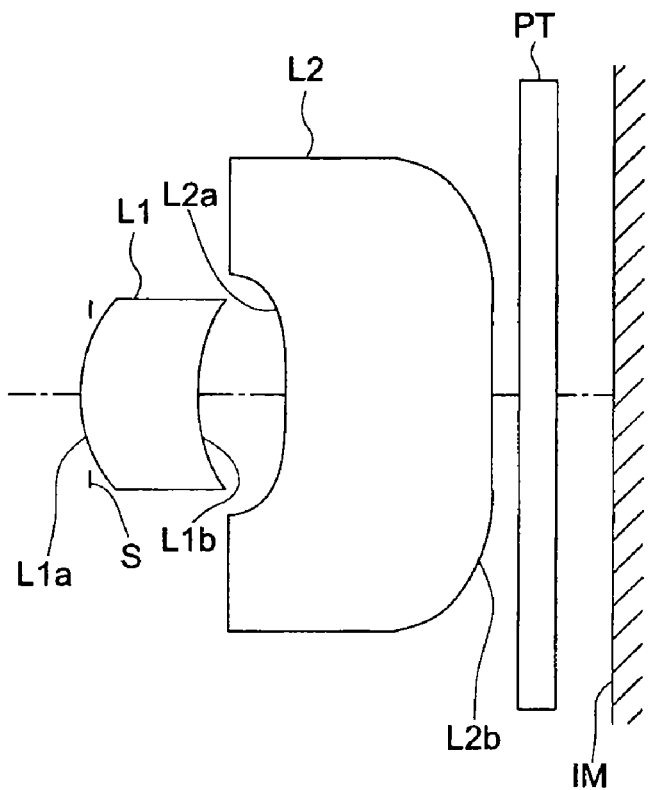
FIG. 41 is a cross sectional view of the image pickup lens shown in Embodiment 12.
Figures 42A, 42B, 42C:
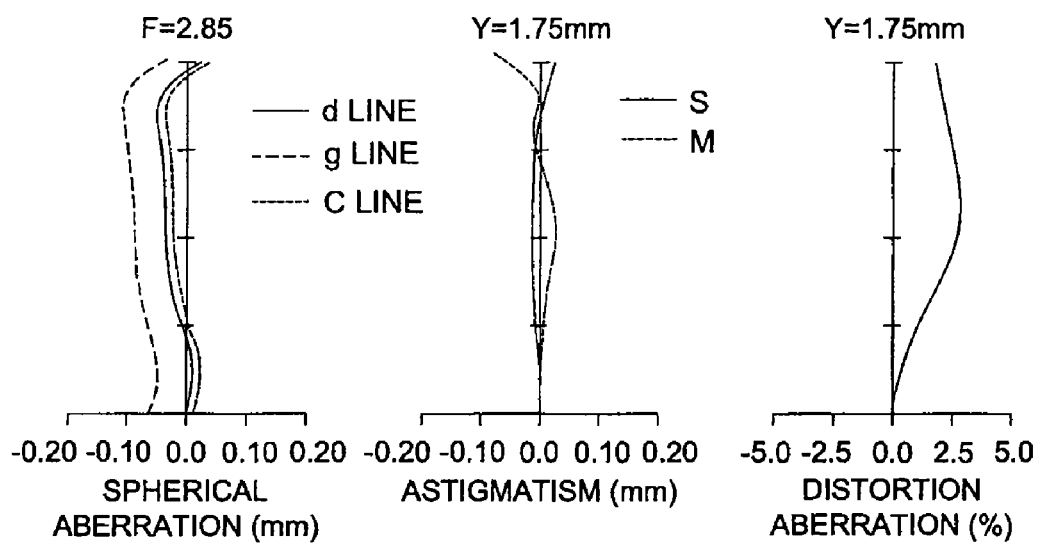
FIGS. 42a, 42b and 42c each is an aberration diagram (spherical aberration, astigmatism, distortion aberration) of the image pickup lens shown in Embodiment 12.
Figure 43:
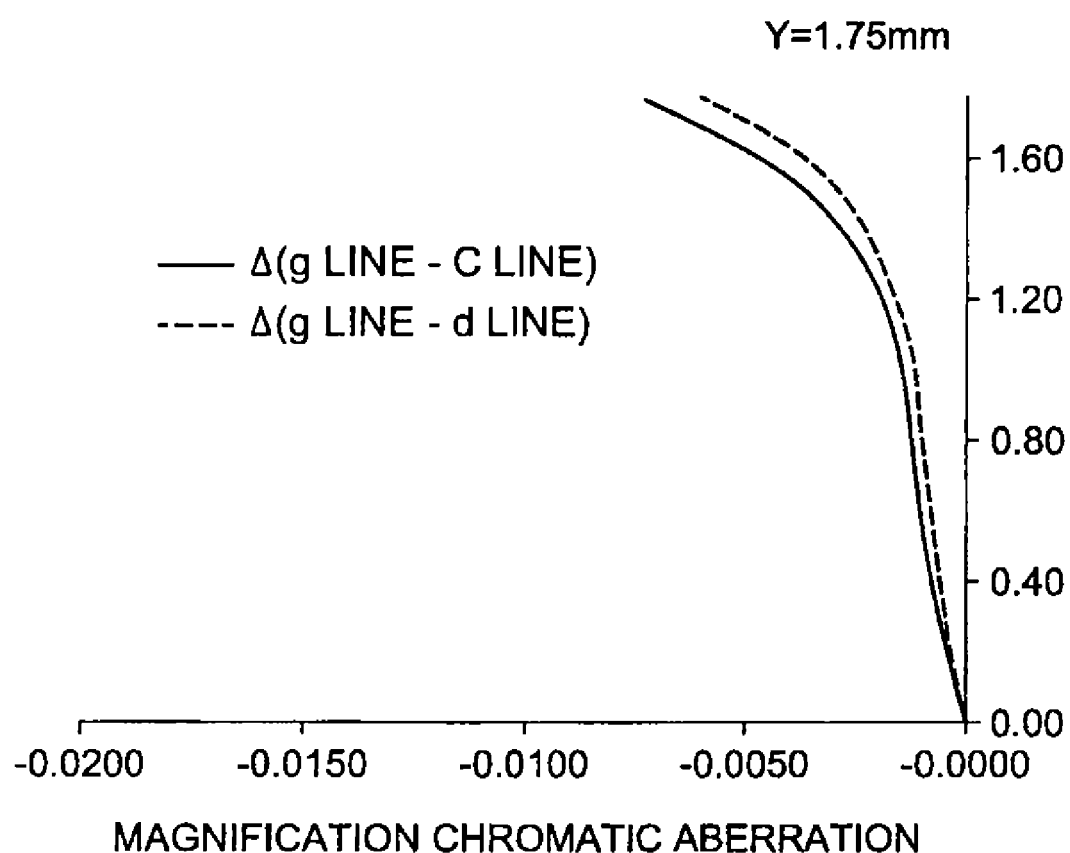
FIG. 43 is a magnification chromatic aberration diagram of the image pickup lens shown in Embodiment 12.

The lens data of Example 12 are shown in Table 12. FIG. 41 is a cross sectional view of the image pickup lens of Example 12. FIG. 42 shows aberration diagrams (spherical aberration (FIG. 42*a*), astigmatism (FIG. 42*b*), distortion aberration (FIG. 42*c*)) of Example 12. FIG. 43 is a magnification chromatic aberration diagram of Example 12. The image pickup lens of Example 12 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

TABLE 12

Example 12
CONSTRUCTION DATA
Reference Wave Length = 587.56 nm
SURF data

| NUM. | r | d | nd | vd | Effective radius |
|---|---|---|---|---|---|
| OBJ | INFINITY | 1000.0000 | | | |
| STO | INFINITY | 0.0500 | | | 1.000 |
| 2 | INFINITY | −0.1232 | | | 1.000 |
| 3* | 0.9181 | 0.7015 | 1.58313 | 59.44 | 1.059 |
| 4* | 1.6817 | 0.5159 | | | 1.058 |
| 5* | −8.4659 | 1.2482 | 1.58313 | 59.44 | 1.347 |
| 6* | INFINITY | 0.1645 | | | 2.777 |
| 7 | INFINITY | 0.2100 | 1.51633 | 64.14 | 3.180 |
| 8 | INFINITY | 0.3540 | | | 3.300 |
| IMG | INFINITY | | | | |

ASPHERICAL SURFACE

| | |
|---|---|
| 3 | K = −2.75211e+000, A3 = −3.12854e−002, A4 = 7.06360e−001, A5 = 0.00000e+000, A6 = −2.26249e+000, A7 = 0.00000e+000, A8 = 1.12250e+001, A9 = 0.00000e+000, A10 = −2.54535e+001, A11 = 0.00000e+000, A12 = 1.95012e+001 |
| 4 | K = −2.08537e+001, A3 = −9.40036e−003, A4 = 7.83522e−001, A5 = 0.00000e+000, A6 = −1.67942e+000, A7 = 0.00000e+000, A8 = 9.44396e+000, A9 = 0.00000e+000, A10 = −2.26100e+001, A11 = 0.00000e+000 A12 = 5.03032e+000, A13 = 0.00000e+000, A14 = 2.02874e+002, A15 = 0.00000e+000, A16 = −4.06727e+002 |
| 5 | K = −5.00000e+001, A3 = −2.01914e−002, A4 = −1.36749e−001, A5 = 0.00000e+000, A6 = −1.28693e+000, A7 = 0.00000e+000, A8 = 2.01103e+000, A9 = 0.00000e+000, A10 = 8.36091e+000, A11 = 0.00000e+000 A12 = −3.97735e+001, A13 = 0.00000e+000, A14 = 3.24045e+001, A15 = 0.00000e+000, A16 = 3.19637e+001 |
| 6 | K = 0.00000e+000, A4 = 2.80710e−002, A6 = −2.03254e−001, A8 = 1.55952e−001, A10 = −4.73225e−002, A12 = −8.90531e−003, A14 = 1.81231e−003, A16 = 6.36243e−003, A18 = −3.17275e−003. A20 = 3.92206e−004 |

| | |
|---|---|
| FL | 2.856 |
| Fno | 2.850 |
| w | 30.205 |
| y max | 1.750 |
| TL | 3.122 |
| BF | 0.657 |

| Elem | Surfs | Focal Length |
|---|---|---|
| 1 | 3-4 | 2.591 |
| 2 | 5-6 | −14.518 |

Example 13

Figure 44:
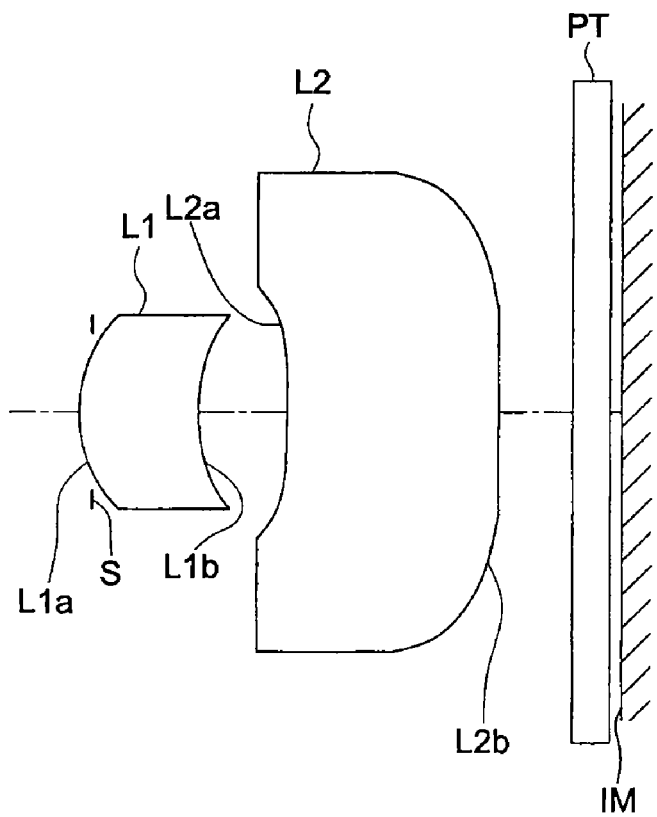
FIG. 44 is a cross sectional view of the image pickup lens shown in Embodiment 13.
Figures 45A, 45B, 45C:
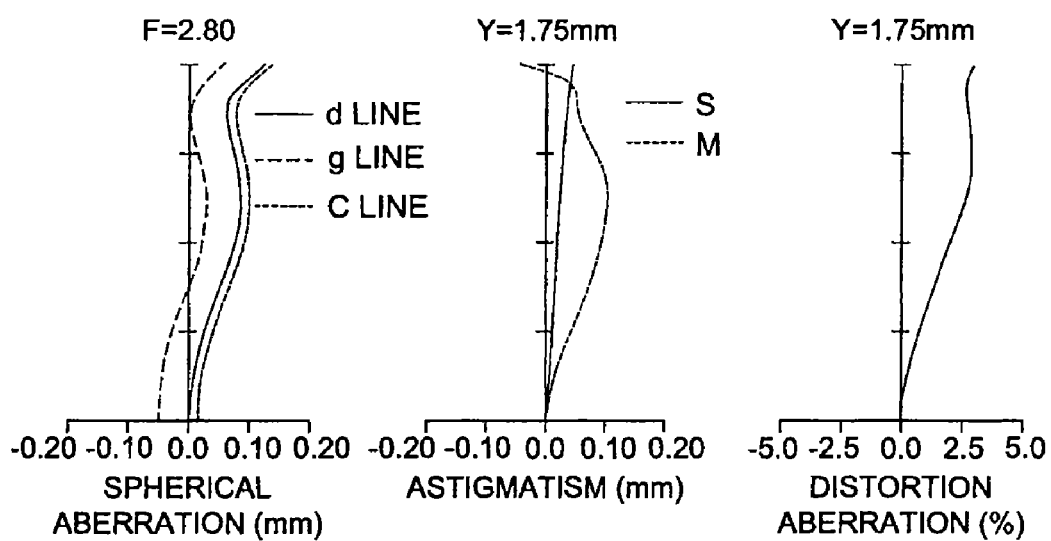
FIGS. 45a, 45b and 45c is an aberration diagram (spherical aberration, astigmatism, distortion aberration) of the image pickup lens shown in Embodiment 13.
Figure 46:
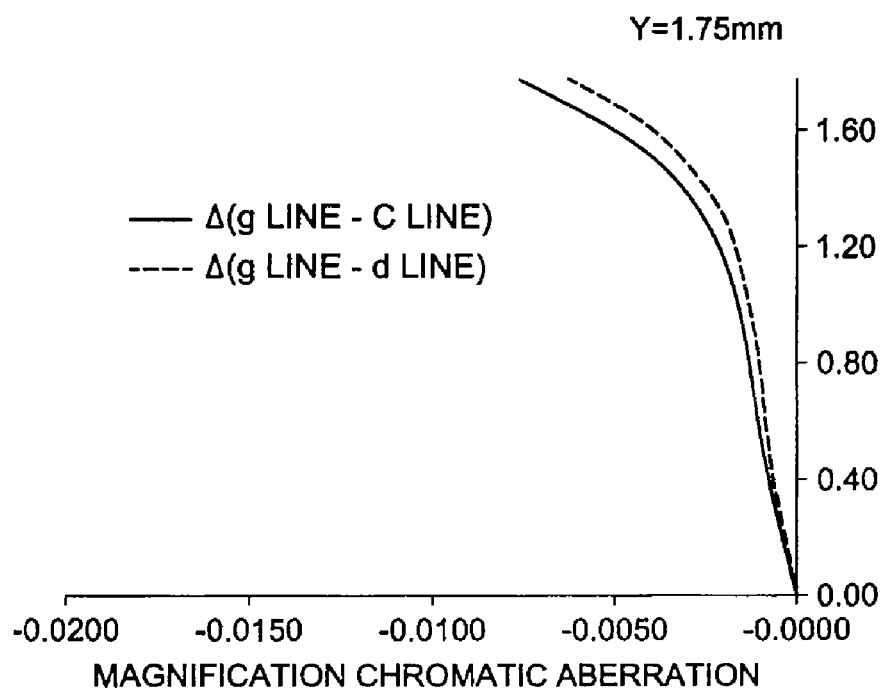
FIG. 46 is a magnification chromatic aberration diagram of the image pickup lens shown in Embodiment 13.
Figure 47:
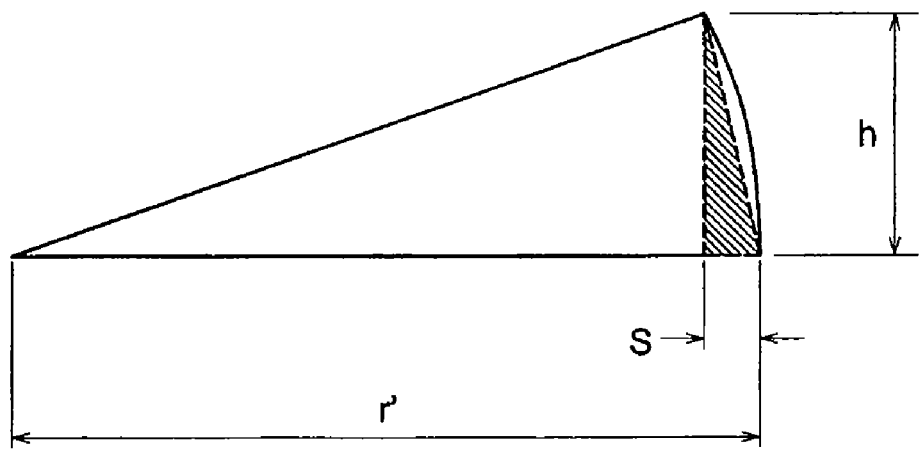
FIG. 47 is an illustration for explaining an approximation value of a paraxial radius of curvature.

The lens data of Example 13 are shown in Table 13. FIG. 44 is a cross sectional view of the image pickup lens of Example 13. FIG. 45 shows aberration diagrams (spherical aberration (FIG. 45*a*), astigmatism (FIG. 45*b*), distortion aberration (FIG. 45*c*)) of Example 13. FIG. 46 is a magnification chromatic aberration diagram of Example 13. The image pickup lens of Example 13 comprises, in the order from the object side, an aperture stop S, a positive meniscus lens L1 having a convex optical surface L1*a* at the object side and a concave optical surface L1*b* at the image side, a negative meniscus lens L2 having a concave optical surface L2*a* at the object side and a convex optical surface L2*b* at the image side, an optical low pass filter, an infrared cut off filter, and a parallel plate PT supposing as a seal glass of a solid state image pickup element. IM is an image pickup plane of the image pickup element. All surfaces of a lens section coming in contact with air are made in an aspheric configuration.

TABLE 13

Example 13
CONSTRUCTION DATA
Reference Wave Length = 587.56 nm
SURF data

| NUM. | r | d | nd | vd | Effective radius |
|---|---|---|---|---|---|
| OBJ | INFINITY | 1000.0000 | | | |
| STO | INFINITY | 0.0500 | | | 0.985 |
| 2 | INFINITY | −0.1235 | | | 0.985 |
| 3* | 0.8851 | 0.6912 | 1.58313 | 59.44 | 1.044 |
| 4* | 1.5496 | 0.5166 | | | 1.030 |
| 5* | −11.9513 | 1.2579 | 1.58313 | 59.44 | 1.420 |
| 6* | INFINITY | 0.4443 | | | 2.800 |
| 7 | INFINITY | 0.2100 | 1.51633 | 64.14 | 3.400 |
| 8 | INFINITY | 0.0950 | | | 3.520 |
| IMG | INFINITY | | | | |

ASPHERICAL SURFACE

| | |
|---|---|
| 3 | K = −6.19474e+000, A4 = 1.08453e+000, A6 = −2.72337e+000, A8 = 1.12439e+001, A10 = −2.80757e+001, A12 = 2.75378e+001, A14 = 0.00000e+000, A16 = 0.00000e+000, A18 = 0.00000e+000, A20 = 0.00000e+000 |
| 4 | K = −3.63859e−002, A4 = 4.80035e−001, A6 = −1.45994e+000, A8 = 5.11805e+000, A10 = 2.48013e+001, A12 = −1.12173e+002, A14 = 2.56102e+002, A16 = −3.96309e+002, A18 = 0.00000e+000, A20 = 0.00000e+000 |
| 5 | K = −4.97023e+001, A4 = −3.75239e−001, A6 = 5.82141e−001, A8 = −3.52798e+000, A10 = 1.15495e+001, A12 = −2.05835e+001, A14 = 1.31934e+001, A16 = −1.31398e+001, A18 = 3.88618e+001, A20 = −2.57988e+001 |
| 6 | K = −5.00000e+001, A4 = −4.46853e−002, A6 = −8.45936e−002, A8 = 8.38436e−002, A10 = −4.01029e−002, A12 = −3.45358e−003, A14 = 5.57249e−003, A16 = 1.24055e−003, A18 = −1.22247e−003, A20 = 1.32724e−004 |

| | |
|---|---|
| FL | 2.734 |
| Fno | 2.800 |
| y max | 1.750 |
| TL | 3.143 |
| BF | 0.677 |

| Elem | Surfs | Focal Length |
|---|---|---|
| 1 | 3-4 | 2.559 |
| 2 | 5-6 | −20.495 |

The value of each conditional formula of each example is shown in Table 14.

TABLE 14

| | | Example 1 | Example 2 | Example 3 | Example 4 | Example 5 |
|---|---|---|---|---|---|---|
| (1) | n1 | 1.59 | 1.58 | 1.58 | 1.61 | 1.58 |
| (2) | d3/f | 0.54 | 0.48 | 0.49 | 0.49 | 0.46 |
| (3) | v2 | 50.00 | 59.46 | 59.46 | 61.22 | 59.46 |
| (4) | n2 | 1.77 | 1.58 | 1.58 | 1.61 | 1.58 |

TABLE 14-continued

|  |  | Example 1 | Example 2 | Example 3 | Example 4 | Example 5 |
|---|---|---|---|---|---|---|
| (5) | f2/f | −3.32 | −3.76 | −3.75 | −7.10 | −4.76 |
| (6) | f/r3 | −0.40 | −0.48 | −0.48 | −0.25 | −0.39 |
| (7) | f/r4 | −0.01 | −0.02 | −0.02 | −0.02 | −0.02 |
| (8) | f1/f | 0.86 | 0.87 | 0.87 | 0.93 | 0.90 |
| (9) | (r1 + r2)/(r1 − r2) | 3.42 | 3.53 | 3.51 | 3.93 | 3.58 |
| (10) | |f1/f2| | 0.26 | 0.23 | 0.23 | 0.13 | 0.19 |
| (11) | fa/f | −0.72 | −0.72 | −0.73 | −0.76 | −0.77 |
| (12) | TL/2Y' | 0.94 | 0.89 | 0.90 | 0.90 | 0.89 |
| (13) | r' (L2 image side surface) | −22737.4 | −12816.5 | −13042.6 | −10631.1 | −12231.7 |

|  |  | Example 6 | Example 7 | Example 8 | Example 9 | Example 10 |
|---|---|---|---|---|---|---|
| (1) | n1 | 1.61 | 1.59 | 1.77 | 1.57 | 1.58 |
| (2) | d3/f | 0.50 | 0.49 | 0.53 | 0.45 | 0.36 |
| (3) | v2 | 61.22 | 85.20 | 68.30 | 40.50 | 59.46 |
| (4) | n2 | 1.61 | 1.49 | 1.59 | 1.73 | 1.58 |
| (5) | f2/f | −5.24 | −5.31 | −75.57 | −2.57 | −3.76 |
| (6) | f/r3 | −0.34 | −0.39 | −0.15 | −0.68 | −0.42 |
| (7) | f/r4 | −0.02 | −0.00 | −0.12 | −0.13 | 0.00 |
| (8) | f1/f | 0.90 | 0.91 | 0.97 | 0.79 | 0.88 |
| (9) | (r1 + r2)/(r1 − r2) | 3.53 | 3.83 | 6.99 | 3.03 | 3.57 |
| (10) | |f1/f2| | 0.17 | 0.17 | 0.01 | 0.31 | 0.23 |
| (11) | fa/f | −0.78 | −0.74 | −0.56 | −0.64 | −0.72 |
| (12) | TL/2Y' | 0.91 | 0.89 | 0.92 | 0.89 | 0.89 |
| (13) | r' (L2 image side surface) | −10788.7 | 107648.8 | −2283.86 | −2169.49 | −58927.1 |

|  |  | Example 11 | Example 12 | Example 13 |
|---|---|---|---|---|
| (1) | n1 | 1.58 | 1.58 | 1.58 |
| (2) | d3/f | 0.37 | 0.44 | 0.46 |
| (3) | v2 | 59.46 | 59.46 | 59.46 |
| (4) | n2 | 1.58 | 1.58 | 1.58 |
| (5) | f2/f | −3.25 | −5.08 | −7.50 |
| (6) | f/r3 | −0.49 | −0.31 | −0.21 |
| (7) | f/r4 | 0.00 | 0.00 | 0.00 |
| (8) | f1/f | 0.87 | 0.91 | 0.94 |
| (9) | (r1 + r2)/(r1 − r2) | 3.40 | 3.40 | 3.66 |
| (10) | |f1/f2| | 0.27 | 0.18 | 0.13 |
| (11) | fa/f | −0.72 | −0.82 | −0.84 |
| (12) | TL/2Y' | 0.91 | 0.89 | 0.90 |
| (13) | r' (L2 image side surface) | −43707.9 | 106697.5 | −55084.1 |

According to the present invention, it is possible to provide an image pickup lens suitable for mass production and miniaturization. The mobile terminal device is not limited to the mobile telephone.

What is claimed is:

1. An image pickup lens, comprising sequentially from an object side:
an aperture stop,
a first lens, and
a second lens,
wherein the first lens is a positive meniscus lens which has a convex surface at the object side and a concave surface at an image side opposite to the object side, the second lens has a concave surface at the object side and an image side surface whose radius of curvature on an paraxial region is infinite or a negative value, and the image side surface of the second lens includes an aspheric surface on which a positive power is made strong toward a lens peripheral region, and
wherein the image pickup lens is made to satisfy the following conditional formulas:

$$1.55 < n1 < 1.80 \quad (1)$$

$$1.063/2.962 \leq D3/f < 0.6 \quad (2)$$

$$40.0 < v2 < 90.0 \quad (3)$$

$$-0.15 < f/r4 < 0.0 \quad (4)$$

where n1 represents a refractive index of the first lens for d spectral line, D3 represents a thickness (mm) of the second lens on an optical axis, f represents a focal distance (mm) of an entire system of the image pickup lens, v2 represents of an Abbe's number of the second lens, and r4 represents a radius of curvature (mm) of an image side surface of the second lens.

2. The image pickup lens described in claim 1, wherein the second lens satisfies the following conditional formula (5):

$$1.55 < n2 < 1.80 \quad (5)$$

where n2 represents a refractive index of the second lens for d spectral line.

3. The image pickup lens described in claim 1, wherein the second lens satisfies the following conditional formula (6):

$$f2/f < -3.0 \quad (6)$$

where f2 represents a focal distance (mm) of the second lens.

4. The image pickup lens described in claim 1, wherein the second lens satisfies the following conditional formula (7):

$$-0.6 < f/r3 < -0.1 \quad (7)$$

where r3 represents a radius (mm) of curvature of the object side surface of the second lens.

5. The image pickup lens described in claim 1, wherein the first lens satisfies the following conditional formula (8):

$$0.8 < f1/f < 1.0 \quad (8)$$

where f1 represents a focal distance (mm) of the first lens.

6. The image pickup lens described in claim 1, wherein the first lens satisfies the following conditional formula (9):

$$3.0 < (r2+r1)/(r2-r1) < 4.0 \quad (9)$$

where r1 represents a radius (mm) of curvature of the object side surface of the first lens, and r2 represents a radius (mm) of curvature of the image side surface of the first lens.

7. The image pickup lens described in claim 1, wherein the first lens and the second lens satisfy the following conditional formula (10):

$$0.1 < |f1/f2| < 0.3 \quad (10)$$

where f1 represents a focal distance (mm) of the first lens and f2 represents a focal distance (mm) of the second lens.

8. The image pickup lens described in claim 1, wherein an air lens between the first lens and the second lens satisfies the following conditional formula (11):

$$0.7 \leq |fa/f| < 0.8 \quad (11)$$

where fa represents the focal distance (mm) of the air lens between the first lens and the second lens and is obtained by the following formula:

$$fa = r2 \cdot r3 / \{r3 \cdot (1-n1) + r2 \cdot (n2-1) - D2 \cdot (1-n1) \cdot (n2-1)\}$$

where r2 represents a radius (mm) of curvature of the image side surface of the first lens, r3 represents a radius (mm) of curvature of the object side surface of the second lens, n1 represents a refractive index of the first lens for d spectral line, n2 represents a refractive index of the second lens for d spectral line, and D2 represents a distance (mm) between the first lens and the second lens on an optical axis.

9. The image pickup lens described in claim 1, wherein the first lens and the second lens are made of a material having a heat resistance property.

10. The image pickup lens described in claim 1, wherein at least one of the first lens and the second lens is made of glass.

11. The image pickup lens described in claim 1, wherein at least one of the first lens and the second lens is made of energy curable type resin.

12. The image pickup lens described in claim 11, wherein inorganic particles with a size of 30 nanometers or less are dispersed in the resin.

13. The image pickup lens described in claim 1, wherein the image side surface of the second lens has a lens surface configuration whose inclination has the same sign in a region within an effective radius except a center of the image side surface.

14. A method of producing the image pickup lens described in claim 1, comprising:
- a process of forming a first lens block on which a plurality of the first lenses are formed and a second lens block on which a plurality of the second lenses are formed;
- a process of making the first lens block and the second lens block into a single body by bonding a periphery of an optical surface of each of the plurality of the first lenses with a periphery of an optical surface of each of the plurality of the second lenses on the condition that each of the plurality of the first lenses faces one of the plurality of the second lenses; and
- a process of cutting the first lens block and the second lens block made in the single body for each pair of the first lens and the second lens.

15. An image pickup device, comprising:
the image pickup lens described in claim 1, and
an image pickup sensor.

16. A mobile terminal device, comprising:
the image pickup device described in claim 15, and
a communicating unit.

* * * * *